US012723884B2

(12) United States Patent
Hamilton

(10) Patent No.: US 12,723,884 B2
(45) Date of Patent: Sep. 1, 2026

(54) HYBRID AND ELECTRIC VEHICLE ENERGY ROUTING TOOL

(71) Applicant: Oregon State University, Corvallis, OR (US)

(72) Inventor: David Hamilton, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 119 days.

(21) Appl. No.: 18/651,520

(22) Filed: Apr. 30, 2024

(65) Prior Publication Data

US 2025/0334416 A1 Oct. 30, 2025

(51) Int. Cl.
*G01C 21/34* (2006.01)
*G01C 21/36* (2006.01)

(52) U.S. Cl.
CPC ..... *G01C 21/3469* (2013.01); *G01C 21/3446* (2013.01); *G01C 21/3461* (2013.01); *G01C 21/367* (2013.01); *G01C 21/3682* (2013.01)

(58) Field of Classification Search
CPC ............ G01C 21/3469; G01C 21/3446; G01C 21/3461; G01C 21/367; G01C 21/3682; G01C 21/3676; G01C 21/3697
See application file for complete search history.

(56) References Cited

U.S. PATENT DOCUMENTS 8,290,701 B2 10/2012 Mason et al.
8,384,710 B2 2/2013 Schlottmann et al.
8,886,453 B2 11/2014 Cerecke et al.
10,233,021 B1 * 3/2019 Brady ................ G01C 21/3697
10,502,578 B2 12/2019 Chen et al.
10,846,937 B2 11/2020 Rogers et al.
11,215,469 B2 1/2022 De Nunzio et al.
11,471,775 B2 10/2022 Benzies
(Continued)

OTHER PUBLICATIONS

Abousleiman et al., "A Bellman-Ford Approach to Energy Efficient Routing of Electric Vehicles," In: IEEE Power Electronics Society, IEEE Power & Energy Society, IEEE Industry Applications Society, editors. Transportation Electrification Conference and Expo (ITEC), 2015 IEEE : date, Jun. 14-17, 2015 (4 pages).
(Continued)

*Primary Examiner* — Kurt Philip Liethen
(74) *Attorney, Agent, or Firm* — MUGHAL GAUDRY & FRANKLIN PC

(57) ABSTRACT

A method for generating a map of energy utilization by a vehicle to facilitate routing, the method comprises selecting a start point and an end point for a vehicle within a route network. The method includes estimating an energy utilization for one or more routes within the route network for the vehicle from the start point to one or more respective intermediate points within the route network and from the one or more respective intermediate points to the end point and/or from the end point to the one or more respective intermediate points and from the one or more respective intermediate points to the start point, based at least partially on an estimated regenerative energy production along the one or more routes by the vehicle. The method includes selecting at least one preferred route from the route network based at least partially on the energy utilization.

19 Claims, 17 Drawing Sheets
(7 of 17 Drawing Sheet(s) Filed in Color)

(56) References Cited

U.S. PATENT DOCUMENTS

| | | | | |
|---|---|---|---|---|
| 2013/0297207 | A1* | 11/2013 | Mason | G08G 1/202 701/400 |
| 2013/0325335 | A1 | 12/2013 | Kee et al. | |
| 2016/0153796 | A1* | 6/2016 | Stankoulov | G01C 21/3469 701/123 |
| 2020/0388153 | A1* | 12/2020 | Cajias | G01C 21/32 |
| 2022/0042812 | A1* | 2/2022 | Chan | G08G 1/096805 |
| 2023/0316927 | A1* | 10/2023 | Kumavat | G06Q 10/083 701/25 |
| 2024/0263964 | A1* | 8/2024 | Kapil | G01C 21/3415 |

OTHER PUBLICATIONS

ArcMap 10.8, Algorithms used by the ArcGIS Network Analyst Extension. Retrieved from https://desktop.arcgis.com/en/arcmap/latest/extensions/network-analyst/algorithms-used-by-network-analyst.htm on Jul. 5, 2023. 3 pages.

Bellman "On a Routing Problem," Quarterly of Applied Mathematics, vol. XVI, No. 1, 1958, pp. 87-90 (4 pages).

Clegg "A Review of Regenerative Braking Systems," Working Paper. Institute of Transport Studies, University of Leeds, Leeds, UK, 1996 (24 pages).

Ding et al., "Forecasting the Sales and Stock of Electric Vehicles Using a Novel Self-Adaptive Optimized Grey Model," Engineering Applications of Artificial Intelligence, vol. 100, Apr. 2021, https://doi.org/10.1016/j.engappai.2020.104148 (13 pages).

Forrest et al., "Estimating the Technical Feasibility of Fuel Cell and Battery Electric Vehicles for the Medium and Heavy Duty Sectors in California," Applied Energy, vol. 276, Oct. 15, 2020, https://doi.org/10.1016/j.apenergy.2020.115439 (13 pages).

Grebner et al., "A Practical Framework for Evaluating Hauling Costs," International Journal of Forest Engineering, vol. 16, No. 2, Jun. 18, 2013, https://www.tandfonline.com/doi/abs/10.1080/14942119.2005.10702520 (15 pages).

Guido van Rossum and the Python Development Team, The Python Library Reference, Release 3.8.2, Feb. 28, 2020 (106 pages).

Hagberg et al., "Exploring Network Structure, Dynamics, and Function Using NetworkX," Los Alamos National Lab, Los Alamos, NM, Conference: SCIPY 08; Aug. 21, 2008, Pasadena, CA. (6 pages).

Harris et al., "Array Programming with NumPy," https://doi.org/10.1038/s41586-020-2649-2, Sep. 16, 2020 (6 pages).

Hudak et al., "Integration of Lidar and Landsat ETM+ Data for Estimating and Mapping Forest Canopy Height," in Remote Sensing of Environment 82 (2002), pp. 397-416 (20 pages).

Hunter, "Matplotlib: A 2D Graphics Environment," IEEE Computing in Science and Engineering, vol. 9, No. 3, May-Jun. 2007, doi: 10.1109/MCSE.2007.55, pp. 90-95 (6 pages).

Kim "Dijkstra Algorithm: Key to Finding the Shortest Path, Google Map to Waze," https://medium.com/@yk392/dijkstra-algorithm-key-to-finding-the-shortest-path-google-map-to-waze-56ff3d9f92f0, Jun. 12, 2019 (19 pages).

Konstantinou et al., "Examining the Barriers to Electric Truck Adoption as a System: A Grey-DEMATEL Approach," in Transportation Research Interdisciplinary Perspectives, vol. 17, Jan. 2023, https://doi.org/10.1016/j.trip.2022.100746 (18 pages).

Leonard et al., "Electrification of a Class 8 Heavy-Duty Truck Considering Battery Pack Sizing and Cargo Capacity," in Applied Science, Special Issue: Novel Hybrid Intelligence Techniques in Engineering, 2022, vol. 12, No. 19, https://doi.org/10.3390/app12199683 (17 pages).

Marshall et al., "A Forest Management Information System for Education, Research, and Operations," in Journal of Forestry—Washington, Jan. 1997 (5 pages).

Sessions et al., "Harvesting Elevation Potential from Mountain Forests," in International Journal of Forest Engineering, 2018, vol. 29, No. 3, doi/abs/10.1080/14942119.2018.1527173, pp. 192-198 (8 pages).

* cited by examiner

| TruckNum | TruckName | Weight (kg) | Tare | Load | PowertrainEff | RegenEff | Frontal Area (m2) |
|---|---|---|---|---|---|---|---|
| 1 | Edison Model R-500 - Tandem | 36,287 | 16,287 | 20,000 | 0.75 | 0.7 | 7.43 |
| 2 | Edison Model R-500 - Tandem | 16,287 | 16,287 | 0 | 0.75 | 0.7 | 4.65 |
| 3 | ELTModel2 | 12474 | 12474 | 0 | 0.75 | 0.6 | 4.65 |
| 4 | ELTModel3 | 12474 | 12474 | 0 | 0.75 | 0.2 | 7.43 |
| 5 | DieselModel1 | 12474 | 12474 | 0 | 0.5 | 0 | 4.65 |
| 6 | DieselModel2 | 17474 | 12474 | 5000 | 0.5 | 0 | 7.43 |
| 7 | DieselModel3 | 12474 | 12474 | 0 | 0.5 | 0 | 4.65 |
| 8 | DieselModel4 | 17474 | 12474 | 5000 | 0.5 | 0 | 7.43 |
| 9 | ATV | 468 | 268 | 200 | 0.6 | 0 | 1 |
| 10 | PickupTruck | 2611 | 2111 | 500 | 0.6 | 0 | 2.2 |

FIG. 6

If Theata ≥ 0, then:

$$Edge\ weight = (AR + RR + GR)$$

If $(Theta < 0)\ and\ \left(|GR| \leq (AR + RR)\right)$, then:

$$Edge\ Weight = (\text{AR} + \text{RR} - |\text{GR}|)\ /\ \text{Power train efficiency}$$

If $(Theta < 0)\ and\ \left(|GR| > (AR + RR)\right)\ and\ Regen\ Efficency\ (\%) > 0$, then:

$$Edge\ Weight = -1 * (|GR| - AR - RR) * Regen\ Efficency$$

If $(Theta < 0)\ and\ \left(|GR| > (AR + RR)\right)\ and\ Regen\ Efficenc = 0$ then:

$$Edge\ Weight = 0$$

Where:

$$AR = 0.5989 * Frontal\ Area\ (m^2) * Velocity(\frac{m}{s}) * Velocity(\frac{m}{s}) * Edge\ Length(m)$$

$$RR = Rolling\ Resistance\ (\frac{kg}{kg}) * Truck\ Weight(kg) * \cos(Theta) * Edge\ Length(m)$$

$$GR = Truck\ Weight(kg) * \sin(Theta) * Edge\ Length(m)$$

FIG. 7

HYBRID AND ELECTRIC VEHICLE ENERGY ROUTING TOOL

TECHNICAL FIELD

This disclosure relates to routing of vehicles and, in particular, generating a map of energy utilization by a vehicle to facilitate routing thereof.

BACKGROUND

New laws and regulations in California, Oregon and other states that are in force or soon to be in force are directed to mandating that some percentage of vehicles in the future to be zero emission, referring to carbon emissions. Manufacturers are therefore producing more electric vehicles (EVs) to meet the demand, but potential customers may be hesitant to adopt EVs, especially for certain situations. It is noted, here, that the term EV, while referring to vehicles in which motion of the vehicle is powered by electric power, is intended to include vehicles in which motion of the vehicle is powered in part by electric power. It is understood, for the purposes of this document, that an EV may include, for example, a so-called hybrid vehicle in which other types of fuel, such as fuel derived from hydrocarbons, may also be used to power motion by the vehicle in conjunction with electric power.

One barrier to EV adoption may be referred to here as "range anxiety." A concern that the particular electric vehicle may not have sufficient charge stored, for example, in an on-board battery supplying electric power for the motion of the vehicle to complete performance of a particular function or task before being able to renew its charge, such as via a charging station. Although this may be a concern in a variety of possible EV situations, this concern may exist, as one example, especially with heavy duty (e.g., class 8) trucks. However, other EV vehicles are not intended to be excluded from this discussion and/or coverage by this patent application.

As one illustrative, non-limiting example, in forestry, a typical and practical way to transport timber and equipment is via heavy duty trucks. However, those in the business of such transportation may be hesitant to invest in electric trucks (ETs), particularly electric logging trucks (ELTs), due at least in part to the typical remote nature of forest harvest operations. Here, electric vehicles, such as an ET or ELT, may include a so-called hybrid vehicle in which other types of fuel, such fuel derived from hydrocarbons, may be used to power the movement of the vehicle in conjunction with electric power. For purposes of discussion convenience, however, vehicles that primarily or even exclusively rely on electric power are discussed, with no loss in generality. Situations involving vehicles powered entirely by fuel derived from hydrocarbons, such as diesel, for example, may, in forestry, for example, have "range anxiety" concerns and, as a result, may be within the scope of claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIG. 6 is a table of parameter values for potential vehicles and potential loads for use in generating a map similar to the map of FIG. 4 or for use in selecting a preferred route similar to the preferred route of FIG. 5, in accordance with at least one example;

FIG. 7 is a set of formulas for use in computing estimates of edge weights for a network or graph, in accordance with at least one example;

DETAILED DESCRIPTION

Figure 1:
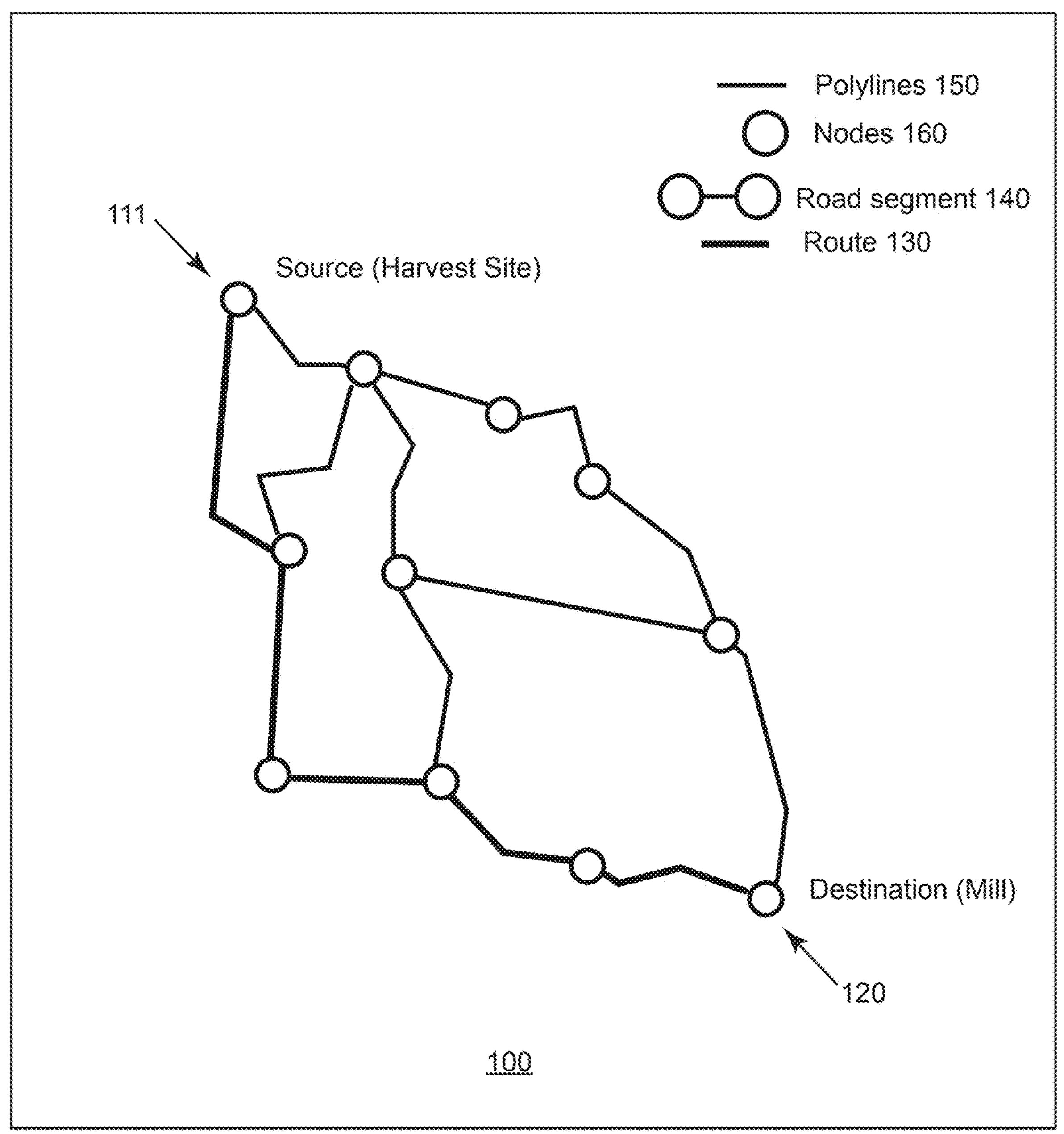
FIG. 1 is an illustration of a schematic diagram showing an implementation of a network or graph in accordance with at least one example.

The situation for ELTs may raise several concerns. First, because forests often exist in remote areas, an electric or even a hybrid truck may not be able to find a charging station in a location sufficient to permit it to complete its task of hauling heavy logs, for example, along a route, which may include returning to a home base, for example. (Again, as mentioned, a similar concern may also exist for vehicles powered only by hydrocarbons, such as diesel, but the concern may be even greater for EVs due at least in part to limited battery capacity and/or a limited number of charging stations in remote vicinities). Second, and related to the first concern, it may be that while an ELT may be suitable in forestry for some forest routes, certain other forest routes used to harvest timber may not be feasible for an ELT because the distance is so great and the route so remote that the truck would not be able to pick up harvested logs at a location, haul the harvested logs, for example, to their destination, and return before draining an on-board battery of its charge with a recharge.

While approaches, such as regenerative braking combined with gravitational potential energy, for example, may provide the opportunity to increase the effective range of electric logging trucks by permitting some charging of the vehicle battery along its route, it may, nonetheless, be difficult to predict for particular remote areas, whether an ET or an ELT, for example, would be able to feasibly complete a particular transportation task along a particular route. In the context of this patent application, regenerative braking and/or regenerative energy production refers to an energy recovery mechanism that slows down a moving vehicle or object by converting its kinetic energy into a form that can be either used immediately or stored for later use.

Again, it is noted that forestry is used as a non-limiting example. A host of other situations may have similar concerns, such as mining operations, farming operations, and even, for example, mail//package delivery, for example, in remote locations and it is intended to include these within the scope of claimed subject matter as well.

A need, therefore, exists for electric vehicle purchasers to have a mechanism to assess whether a particular vehicle will be suitable for particular tasks that may consume significant electric energy from an electric vehicle's battery before making a purchase decision and/or, likewise, a need exists for electric vehicle owners to have a mechanism to assess, before using a particular electric vehicle for a particular task, whether the particular vehicle will be suitable to complete the particular task or will, instead, consume such amounts of electric energy from the electric vehicle's battery to make completing the task not feasible.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents. Rather, it is to be understood that other implementations are contemplated and may be utilized. Also, examples have been provided of claimed subject matter herein and it is noted that, as such, those illustrative examples may be inventive and/or unconventional; however, claimed subject matter is not necessarily limited to examples provided primarily for illustrative purposes. Thus, while advantages may have been described in connection with illustrative examples, claimed subject matter may be inventive and/or unconventional for additional reasons not expressly mentioned in connection with those examples. In addition, references throughout this specification to "claimed subject matter" refer to subject matter intended to be covered by one or more claims and are not necessarily intended to refer to a complete claim set, to a particular combination of claims and/or claim sets (e.g., method claims, apparatus claims, etc.), and/or to only a particular claim.

In general, the world uses energy to maintain physical comfort, to manufacture, for transport, for communications, for agriculture and for industry. Thus, the main uses of controlled energy include transport, agriculture, industry, commerce, and households. A typical example is in the case of powering movement of a vehicle for completing a transporting task. Although for most of the past, fuels made from hydrocarbons have been a dominant source to power movement of such vehicles, electric power as a source of energy for vehicle movement is becoming more popular, for example, to reduce carbon emissions. A hydrocarbon is an organic compound comprising hydrogen and carbon found in crude oil, natural gas, and coal. Hydrocarbons are highly combustible and have been the main energy source of the world. Its uses include gasoline, jet fuel, propane, kerosene, and diesel, to name just a few. However, carbon emissions are a byproduct of such combustion and may have a detrimental environmental impact, making electric power more desirable if able to be feasibly employed in various situations.

Electric power, for a situation in which it supplies energy for vehicle movement, is typically stored in a battery as charge and powering the vehicle, such as for movement, may drain that energy from the battery. In situations in which a so-called electric vehicle is involved, then, such energy, again, in the form of charge, should be replenished.

As also previously mentioned, forestry is discussed with reference to an illustrative implementation of claimed subject matter; however, it is not intended that claimed subject matter be limited in scope to example illustrations. As was mentioned, for example, a host of other situations may have similar concerns, such as mining operations, farming operations, and mail/package delivery, for example, in remote locations. It is intended that claimed subject matter covers all applicable other situations, including some not in remote locations.

However, continuing with logging as an illustration, it may come as a surprise to a layperson that typically 40-60% of the cost of harvesting lumber may be attributable to fuel costs. This problem has been recognized and discussed in literature. For example, forest planners may select travel routes for a vehicle hauling logs to limit fuel consumption in situations employing hydrocarbon derived fuel to power the vehicles hauling the logs.

In a typical situation, a logging truck may travel to the top of a hill, pick up a heavy load, and then travel downhill for delivery to a mill at lower elevations. Likewise, the truck may make a return trip to get its next load. It has also been recognized, due at least in part to this change in elevation, one may harvest (or capture) some of the potential energy and/or kinetic energy associated with a particular route to conserve on round trip fuel costs. For example, regenerative braking combined with gravitational potential energy may provide an opportunity to increase the effective range of electric logging trucks, again, as a non-limiting illustration. It is noted, here, that likewise, claimed subject matter is not necessarily restricted to regenerative energy production, such as via regenerative braking. For example, as described in more detail later, in at least one example, a vehicle might also include a solar panel and use solar energy to potentially increase the effective range of an electric vehicle, such as an electric logging truck. In such a case, for example, one might also include real-time weather reports and/or traffic reports to assist in routing and/or scheduling associated with an implementation that also captures solar energy.

Whether a vehicle uses hydrocarbon fuel or electric power, this use (e.g., consumption) of energy may be viewed as a cost. However, the manner to preferably reduce such costs by much more effectively capturing energy via regenerative braking, for example, along a few selecting routes over many potential routes, such as a host of possible routes across a landscape, remains unclear. Toward an objective of reducing fuel costs, forest road networks are typically designed with timber located at high elevations and mills or log sort yards located at low elevations. Similarly, short- and long-range goods hauling and delivery and other transportation operators encounter routes that include significant elevation differences from point to point. For example, trucks hauling heavy loads may cross mountain ranges and ride over hilly terrain. Such routes may have relatively large downhill grades (e.g., >3% grade). As alluded to above, electric vehicles (EVs), particularly electric trucks (E-trucks) and electric logging trucks (ELTs) may provide an additional opportunity via regenerative braking, for example, to capture the vehicle's kinetic energy by charging the battery while braking while traveling down a graded portion of a road. This stored energy may then be used along the route to increase the potential range for the EV. However, as suggested, how to choose such routes going up and down to more effectively take advantage of the energy to be captured in this manner is unclear. Again, as previously suggested, energy recapture may be particularly desirable for terrain that is remote and as such, rarely provide access to charging stations, electricity, or even other types of fuel. It will be understood that while electric trucks are used in examples, implementations of the disclosed method, all types of electric vehicles, including hybrid vehicles, are considered to be within the scope of the disclosed method.

Although route planning and optimization is a well-studied area of technology, such as in operations research and/or computer science, for a variety of reasons, energy recapture using regenerative braking systems, for example, does not appear to have been considered in connection with such technology. Various processes are known, for example, to determine a "shortest cost" path or route between the nodes of a network connected by edges in which the edges have weights to reflect a "cost."

Typically, a computer or computing device is used to make such a determination using values assigned to the edges of a network of routes. Typically, an edge in a network of routes is a road segment that stretches between two nodes. A node is an endpoint of an edge; thus, each edge has two nodes defining the edge. Typically, nodes in a route network are points of intersection of two or more edges or routes. Nodes may also include starting points, way stations, and destinations. For example, a node may be a town, an intersection of streets, a distance from a starting point, or other particular locations within a network of routes. Typically, an edge weight or cost is assigned to an edge. A "cost" may generally refer to distance or time; however, in accordance with at least one implementation, edge weights might instead be estimates of energy utilization if a particular edge were traversed by a particular vehicle for a network of edges connecting nodes. In this manner, routes may potentially be identified by calculating energy utilization in a manner that considers energy regeneration production. Energy utilization of an electric vehicle, here, net energy usage, therefore, may include energy regeneration by the electric vehicle during performance of a particular task. Thus, for travel along routes within a network by a vehicle, such as a vehicle able to haul, carry, and/or transport, etc., a load (e.g., a loadable vehicle), net energy usage (e.g., energy utilization) may be estimated via computer operation and/or processing.

As a non-limiting example of an implementation, now with reference to FIG. 1, consider graph 100 of a network of routes for use in route selection. Again, this network is a different type of network than a communications network 208 (FIG. 2A) to make sure common terminology for different situations does not result in some confusion. Graph 100, here, comprises a network of routes, such as may exist across a particular landscape. Graph 100, as shown, includes a source 111 and a destination 120. Likewise, the network implementation includes one or more routes 130 shown as a series of interconnected road segments 140 (also referred to as "edges"), which may, in an implementation, be further broken into subunit polylines 150, that may connect nodes 160 in graph 100 and which may, in an implementation be directional. Road segments 140, in a non-limiting implementation, may have associated parameters that typically have been estimated, including: estimated distance, estimated slope and/or other ground condition factors, which, for an example implementation, may affect estimates of rolling resistance of a vehicle.

An implementation of a graph or network may comprise a multidirectional graph of edges (not shown in FIG. 1) in which an edge may include a weight estimate calculated, for example, using parameter estimates associated with road segments of the multidirectional graph or network implementation. In at least one example, a weight along an edge of road segments may reflect an estimated amount of energy gained or lost by a vehicle traveling along the particular edge in the particular direction of the edge. It is noted here that the terms graph and network may be used interchangeably throughout this document with no loss in comprehension, understanding and/or generality. Calculation of edge weight estimates for an implementation are described in more detail below. It is noted here that it is assumed that such edge weight estimates, in this implementation, are intended for a vehicle capable of regenerative energy production, such as a vehicle with a battery able to be charged at least in part via regenerative braking of the vehicle. In at least one example, regenerative braking of the vehicle and its ability to charge a vehicle is a factor in calculating edge weight estimates, which may assist in determining routing of the vehicle through a remote area, for example.

This illustrative implementation, or other examples thereof, discussed in more detail below, may address some deficiencies that exist with other similar approaches to routing of vehicles, especially electric vehicles. For example, other approaches may use distance or time estimates as edge weights and then compute energy gain or loss. However, such an approach may not result in selection of a preferred route to sufficiently reduce energy utilization, at least compared with other available routes, in the case of a vehicle with regenerative braking, for example. Other routing approaches may also not be multidirectional and/or may not accommodate negative weights. Such approaches, therefore, may not properly account for energy recapture via regenerative energy production as a result. Finally, no researchers appear to have developed a methodology for spatially measuring energy across road segments for vehicles with regenerative braking, particularly, for example, in mountainous, forested terrain with favorable road grades and different loads at high and low elevations. Thus, again, such other approaches may not result in a preferred route to sufficiently reduce estimated energy utilization compared with other available routes for use in hauling timber, as one example, and/or may not properly account for the possibility of energy recapture.

Figure 2A:
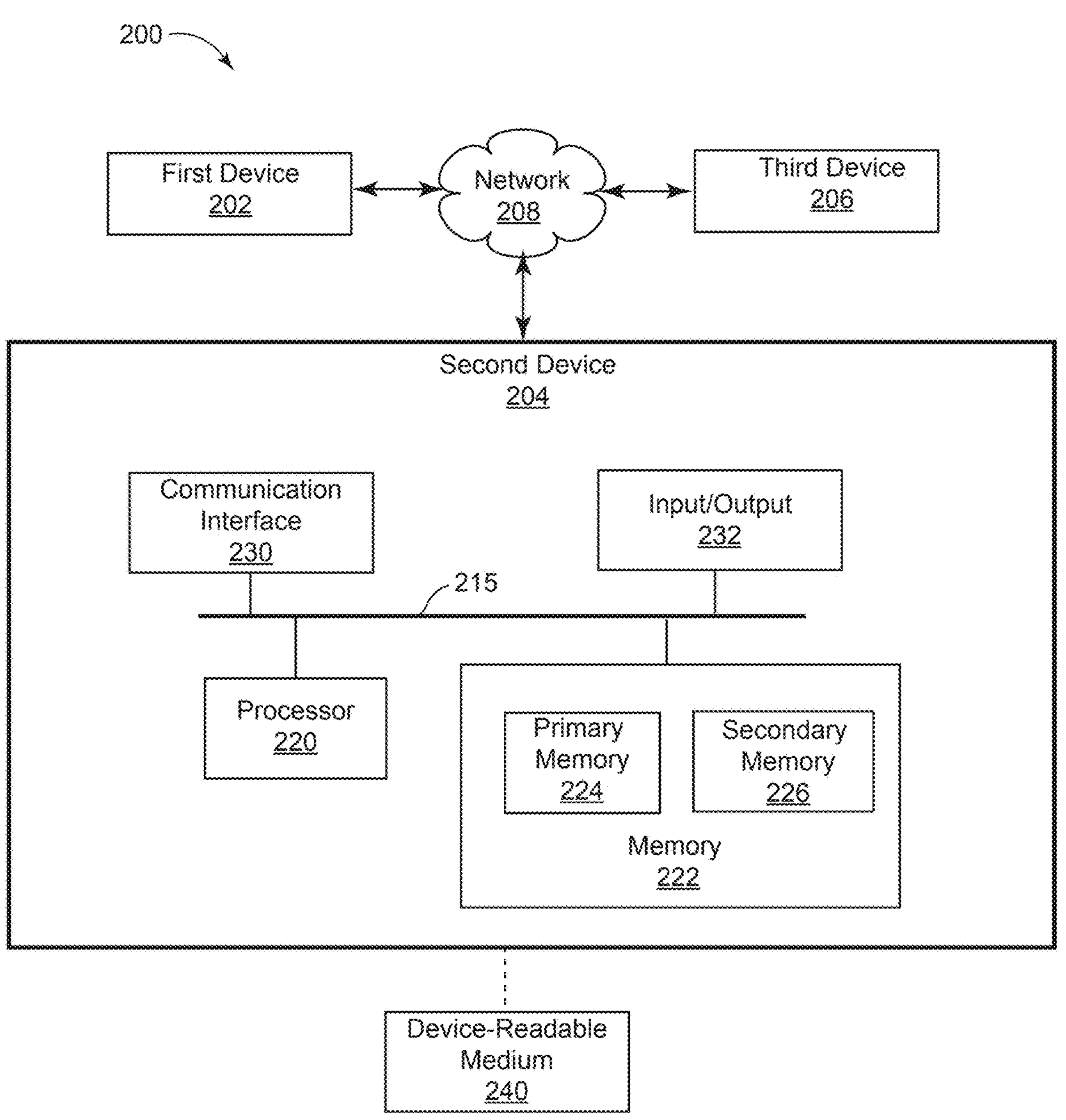
FIG. 2A is an illustration of a schematic diagram showing an implementation of a computing and/or communications network that includes several computing devices able to mutually communicate via the computing and/or communications network, in accordance with at least one example.

Now, referring to FIG. 2A, in at least one example, computing system 200, may comprise features, for example, of a client computing device and/or a server computing device. It is further noted that the term computing device, in general, whether employed as a client and/or as a server, or otherwise, refers at least to a processor and a memory connected by a communication bus. A "processor," for example, is understood to connote a specific structure such as a central processing unit (CPU) of a computing device which may include a control unit and an execution unit. In an aspect, a processor may comprise a device that interprets and executes instructions to process input signals to provide output signals.

Thus, as suggested, an implementation of claimed subject matter may include a computing device, such as computing device 204. Memory 222 of computing device 204 may provide one or more sources of executable computer instructions in the form physical states and/or signals (e.g., stored as memory states), for example. Computing device 202 ("first device" in the figure) may communicate with computing device 204 by way of a network connection, such as via computing and/or communications network 208, for example. (It is noted that, here, reference is made to a computing and/or communications network, not to be confused with a network of routes across a landscape, for example). A network connection in the context of network 208, for example, while physical, typically may not necessarily be tangible, such as a wireless connection (in comparison to a wired connection, for example). Although computing device 204 of FIG. 2A shows various tangible, physical components, claimed subject matter is not limited to a computing device having only these tangible components as other implementations may include alternative arrangements that may comprise additional tangible components or fewer tangible components, for example, that may likewise function differently while achieving similar results. Rather, examples are provided merely as illustrations. It is not intended that claimed subject matter be limited in scope to illustrative examples.

Memory 222 may comprise any non-transitory storage mechanism. Memory 222 may comprise, for example, primary memory 224 and secondary memory 226, additional memory circuits, mechanisms, or combinations thereof. Memory 222 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 222 may be utilized to store a program of executable instructions, such as executable computer instructions. For example, processor 220 may fetch executable instructions from memory and proceed to execute the fetched instructions. Memory 222 may also comprise a memory controller for accessing device-readable medium 240 (e.g., a non-volatile storage device such as a magnetic hard drive or a solid state drive, optical disk or a micro storage card) that may carry and/or make accessible digital content, which may include code, and/or instructions, for example, executable by processor 220 and/or some other device, such as a controller, as one example, capable of executing instructions, such as computer instructions, for example. Under direction of processor 220, a non-transitory memory, such as memory cells storing physical states (e.g., memory states), comprising, for example, a program of executable instructions, may be executed by processor 220 and able to generate signals to be communicated via a network, such as network 208, for example, as previously described. Generated signals may also be stored in memory as physical memory states, also previously suggested.

FIG. 2A also illustrates computing device 204 as including a component 232 operable with input/output devices and communication interface 230, for example, so that signals and/or states may be appropriately communicated between devices, such as computing device 204 and an input device and/or computing device 204 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals, referred to, for example, as a speaking event. A user may make use of an output device, such as a display, a printer, etc., and/or any other device capable of providing signals and/or generating stimuli for a user, such as visual stimuli, audio stimuli and/or other similar stimuli.

Figure 2B:
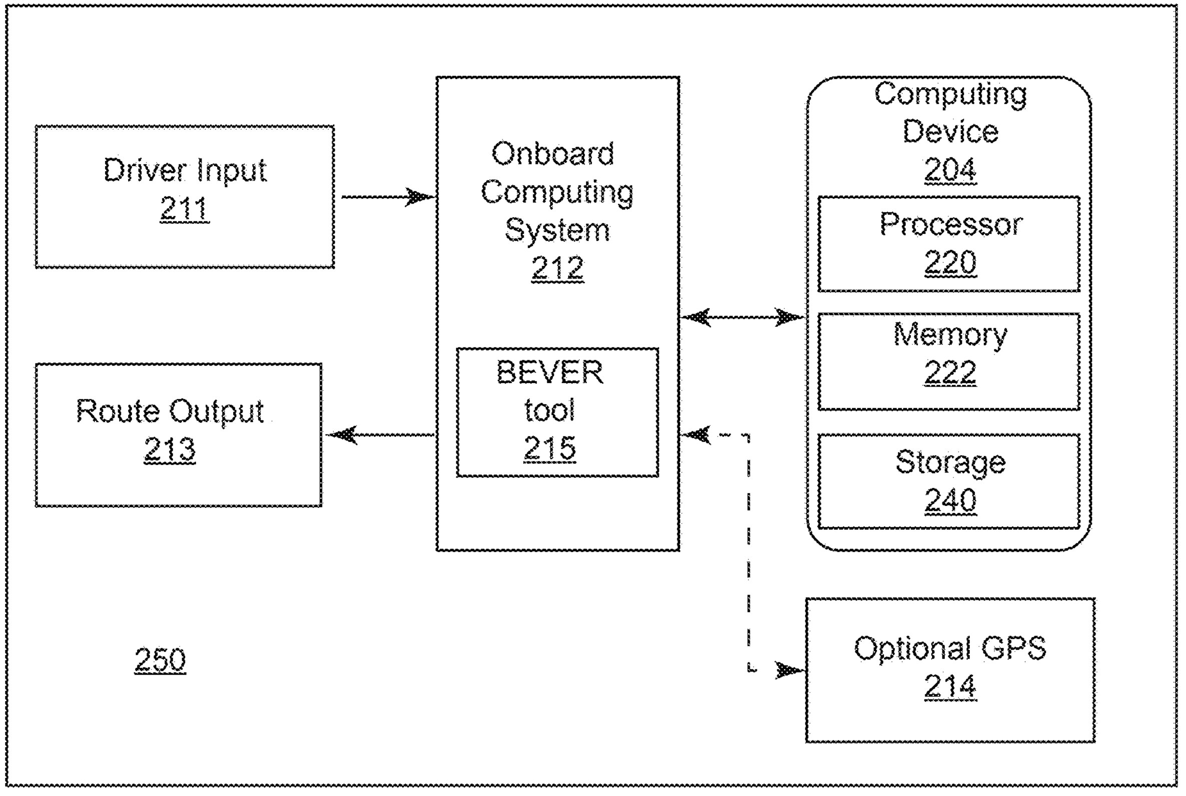
FIG. 2B is an illustration of a self-contained network implementation of the computing network of FIG. 2A, in accordance with at least one example.

FIG. 2B depicts an exemplary implementation of computing system 200 shown in FIG. 2A, where an onboard self-contained network 250 is diagrammed. The onboard nature of network 250 refers to the use by a driver in a vehicle, thus the system is self-contained in the sense that there is no connection to a remote computing network or cloud network. Computing system 200 may be embodied within a portable computing device such as a tablet, smartphone, or laptop where the computing device is on board in an EV, internal combustion engine (ICE), or hybrid vehicle. It is understood that in at least one example, computing system 200 is fully self-contained, in that it is configured to function fully offline (e.g., no internet connection), as may be the case in a rural or mountainous landscape. The assumption is that no service is available in some rural or remote areas where the driver and vehicle will operate. Thus, network 250 is fully self-contained. Network 250 comprises computing device 204 (as indicated in computing system 200 in FIG. 2A. Computing device 204 comprises processor 220, memory 222, and device-readable medium (e.g., storage) 240. In at least one implementation, computing device 204 may include a graphical processor unit (GPU) to process a graphical user interface and map output (e.g., route output display 213) on a display. In at least one implementation, on-board computing system 212 interfaces driver input device 211, route output display 213 with computing device 204. In at least one implementation, on-board computing system 212 is an operating system or a peripheral device controller. In at least one implementation, driver input device 211 enables a vehicle driver, which can be a human or an autonomous system, to select the type of vehicle driven from a list of possible options, as well as starting and ending destinations. In at least one implementation, driver input device 211 may be a keyboard, such as on a smartphone, tablet, or laptop for manual input by a human driver or operator of the vehicle. In at least one implementation, driver input device 211 may be an interface to an automated device such as a hard drive or solid-state drive (e.g., device-readable medium 240) containing input data.

In at least one implementation, energy routing software computational engine 215, which may be referred to as "BEVER Tool" ("BEVER" is an acronym for "Battery-Hybrid Electric Vehicle Energy Routing) is depicted as a separate module that is incorporated into on-board computing system 212. In at least one implementation, energy routing software computational engine 215 incorporates the software flowchart presented in FIG. 9 and described below. In at least one implementation, energy routing software computational engine 215 is at least partially stored in device-readable medium (e.g., disk storage) 240 and in memory 222. Processor 220 may execute the code of energy routing software computational engine 215 taking input data at driver input device 211 and displaying results through route output display 213. Again, displayed results may be in the form of a graphical map displayed on a screen of a tablet or smartphone, for example.

In at least one implementation, a global positioning system module (GPS) 214 may be included within computing system 200 and coupled to on-board computing system 212 to add location coordinates, enabling overlay on GIS mapping data. GPS module 214 may also enable real time tracking of an EV or ICE vehicle along a route so that the driver may monitor progress along a particular route, keep track of distance traveled and nodes visited, as well as keep abreast of estimated time of arrival (ETA) to upcoming nodes and destinations.

Figure 2C:
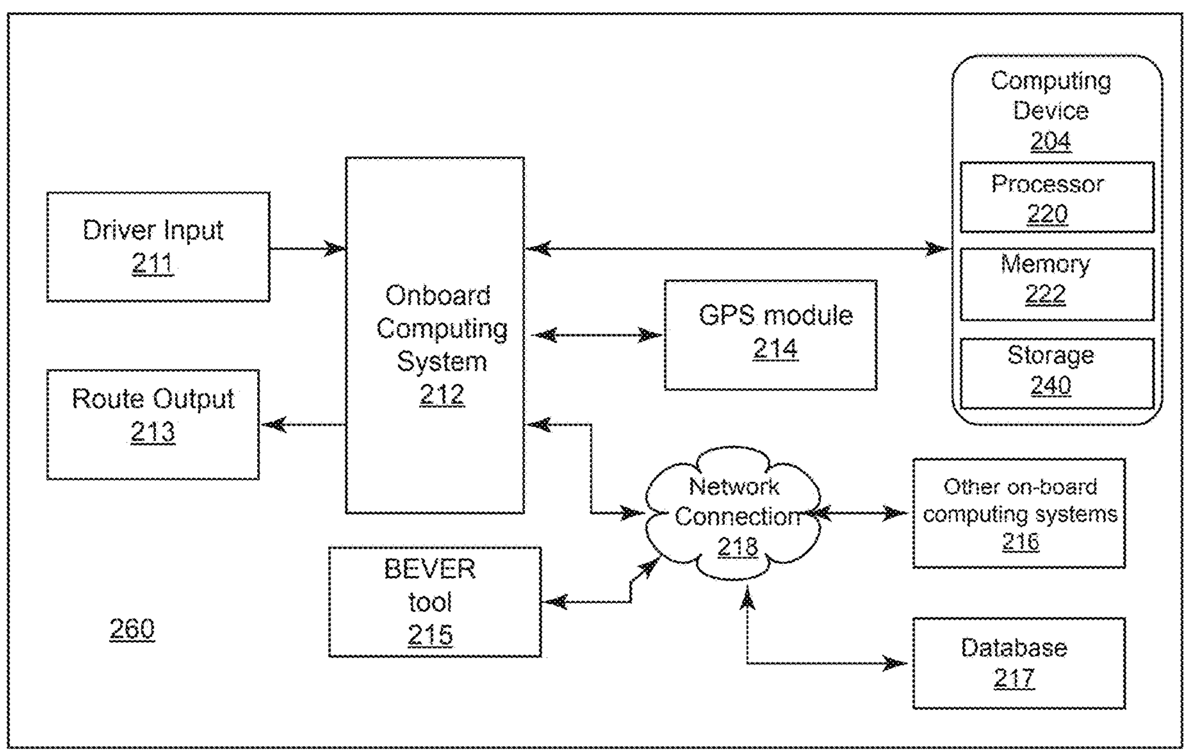
FIG. 2C is an illustration of a cloud-based implementation of the computing network of FIG. 2A, in accordance with at least one example.

FIG. 2C depicts an alternate implementation of computing system 200 shown in FIG. 2A, where a cloud-based network 260 is diagrammed. The cloud-based nature of network 260 enables internet connectivity for cloud-based network 260, for example, through a cellular network. In at least one implementation, cloud-based network 260 functions substantially as described for network 250, apart from a database 217 and an internet interface 218 incorporated into cloud-based network 260. Again, hardware aspects of cloud-based network 260 may be incorporated within a portable computing device such as a tablet, smartphone, or laptop. Energy routing software computational engine 215 is shown as a self-contained module, connected to internet interface 218. In at least one implementation, energy routing software computational engine 215 may be stored on a cloud-based remote server, for example, accessible through an internet connection. This configuration may be useful for a central dispatch or logistics command, for example, to keep track of individual ELTs in a fleet of such vehicles, for example, and to update routing for drivers to follow.

In at least one implementation, database 217 may coordinate the EV (e.g., an ELT or an E-truck) or ICE vehicle, may integrate optional network features. Such features may include traffic slowdowns, weather, road conditions, fleet schedule, etc. Such features may be managed by module 216, comprising other on-board computing systems.

In at least one implementation, a computing device, such as 204, may include executable instructions stored via one or more memories. In at least one implementation, executing instructions by one or more processors of computing device, such as 204, that may be coupled to one or more memories, such as memory 222, may result in performance of a method, such as a method of generating a map of energy utilization, as discussed in more detail below. At least one implementation may comprise executing instructions that may result in performance of a method in accordance with claimed subject matter. In at least one implementation, the instructions may be executed by a computing device with a display, such as a smart phone or tablet, but as mentioned previously and as later discussed, may likewise comprise a computer that is part of a computing and/or communications network in which the device may comprise a client and/or server.

In at least one implementation, executing the instructions may result in routing of one or more electric vehicles using one or more multidirectional network graphs with negative edge weight estimates to account for estimated regenerative energy production, such as from regenerative braking, along segments of the multidirectional network graphs. Likewise, the routing may comprise using estimated energy loss and/or generation as an edge weight, in accordance with at least one implementation. In at least one implementation, one or more multidirectional network graphs may represent a landscape, and the routing of one or more electric vehicles using one or more multidirectional network graphs with negative edge weight estimates to account for estimated regenerative breaking. In at least one example, the landscape and routing may facilitate generation of a color-coded map depicting estimated energy expenditure by the one or more electric vehicles if used to travel routes across the landscape hauling a load.

In at least one example, an energy utilization map for a graph and/or network of routes may be generated and/or displayed based at least in part on estimated regenerative energy production along the routes by a vehicle. The vehicle may be a loadable vehicle that, for example, includes a battery chargeable via regenerative energy production. Again, however, it is noted that claimed subject matter is not limited in scope in this respect. As examples, such a map may be generated for a variety of vehicles of different sizes, shapes and/or weights. Likewise, a vehicle may comprise a hybrid vehicle, a diesel vehicle, and/or may involve multiple vehicles.

In at least one implementation, a start point and an end point within a network may be selected by a user who may be operating a computing device, such as 204. Again, therefore, for an implementation, energy utilization, for travel along the routes within the network by an electric vehicle, such as a vehicle able to haul, carry, and/or transport, etc. a load (e.g., a loadable vehicle), may be estimated via computer operation and/or processing. Again, the loadable vehicle may comprise an electric vehicle capable of regenerative energy production.

Figure 3:
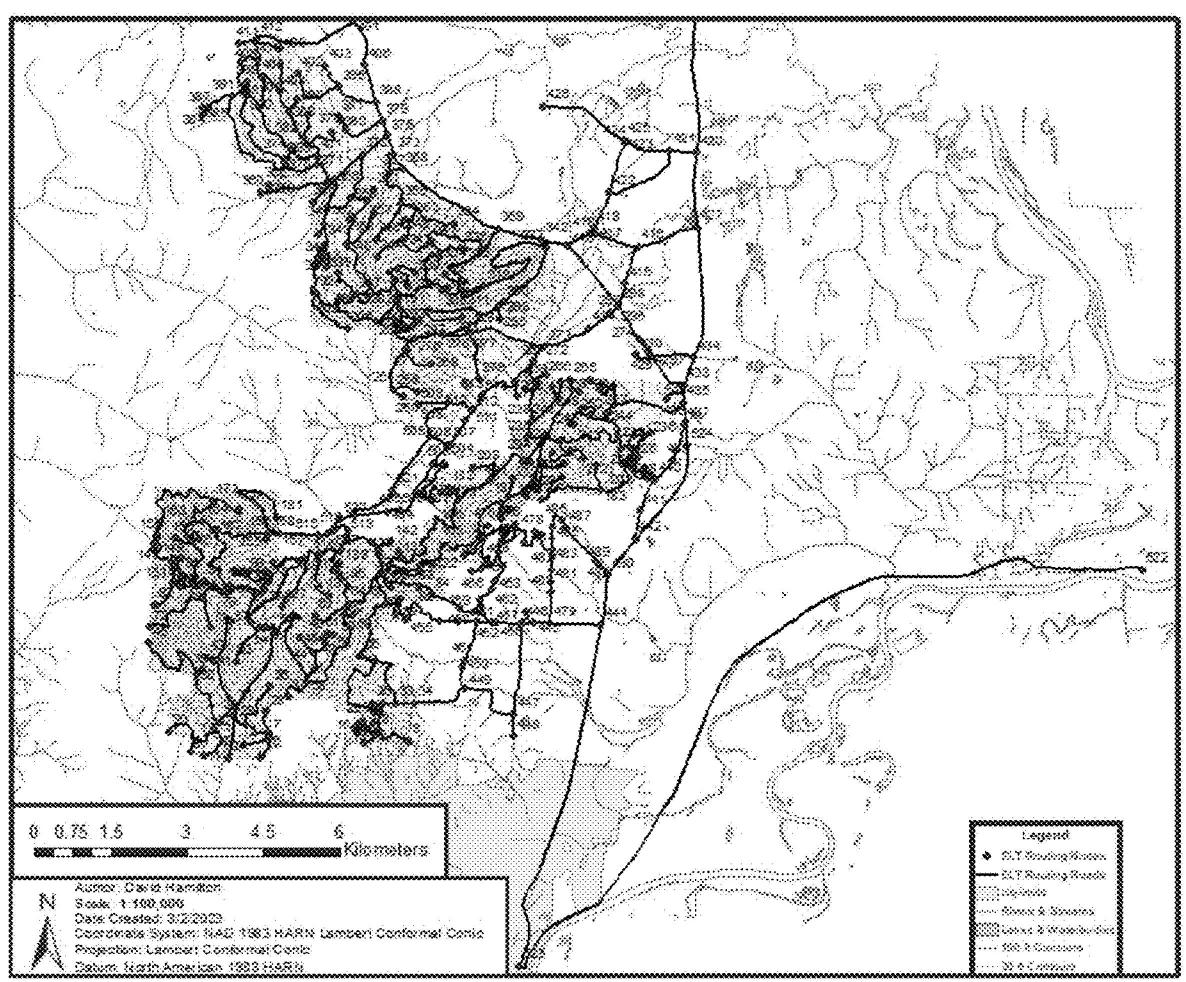
FIG. 3 is an illustration of a map of a landscape, for which a network of nodes and edges has been constructed, in accordance with at least one example.

In at least one implementation, from the start point to one or more respective successive intermediate points within the network and from the one or more respective successive intermediate points to the end point, energy utilization may be estimated based at least in part on the estimated regenerative energy production along the routes by the loadable vehicle for situations in which the loadable vehicle may be unloaded, partially loaded, such as loaded with one or more partial loads along the route, and/or fully loaded. This energy estimation may be performed for a host of possible routes within the network and/or with the vehicle carrying a host of possible loads. Such an estimation may be performed for virtually all the possible routes within a network, such as illustrated in FIG. 3, if not for literally all of the possible routes within a network, in at least one implementation, again, with a host of possible loads.

As simply a non-limiting illustrative example, one route may be referred to, here, as a trip because it may include several stops. For example, the vehicle may route from a start point unloaded to a first intermediate point where the vehicle may be partially loaded with timber, the vehicle may then route to another possible, second intermediate point and may be loaded with more timber. The vehicle may then route to the endpoint and be unloaded. However, alternatively, for this trip, the vehicle may route to a third, intermediate point and be partially unloaded, before traveling to the end point, where it may be completely unloaded.

Using a computing device, such as 204, for example, this estimation may be done across a forest landscape with starting (e.g., start), ending (e.g., end), and intermediate points. Such a landscape is illustrated in FIG. 3, displaying the McDonald Dunn research forest, located to the north of Corvallis, Oregon and managed by Oregon State University's College of Forestry. The McDonald Dunn Forest landscape is over 4700 ha (47 km2) in size. Conveniently, the GIS database contains values related to harvest polygon units (also referred to as "harvest unit polygons," herein) and road lines for that forest developed starting in the 1980's and has been continued to be used for forest management since the late 1990's. In at least one implementation, as suggested, energy estimations for routes across a landscape, such as this example, may be performed by representing this landscape as a network.

In at least one implementation, using values attributable to the network, such as edge weights reflecting estimates of energy lost or gained from travel by a vehicle along those edges, energy utilization estimations may be made, accumulated and/or organized. In at least one implementation, energy utilization estimations are employed to generate an energy utilization map, such as on a display, illustrated, for example in FIG. 4. For example, such a map may be displayed on a smart phone, a tablet with touch screen technology, or even on a networked computer monitor, as a few examples.

Figure 4:
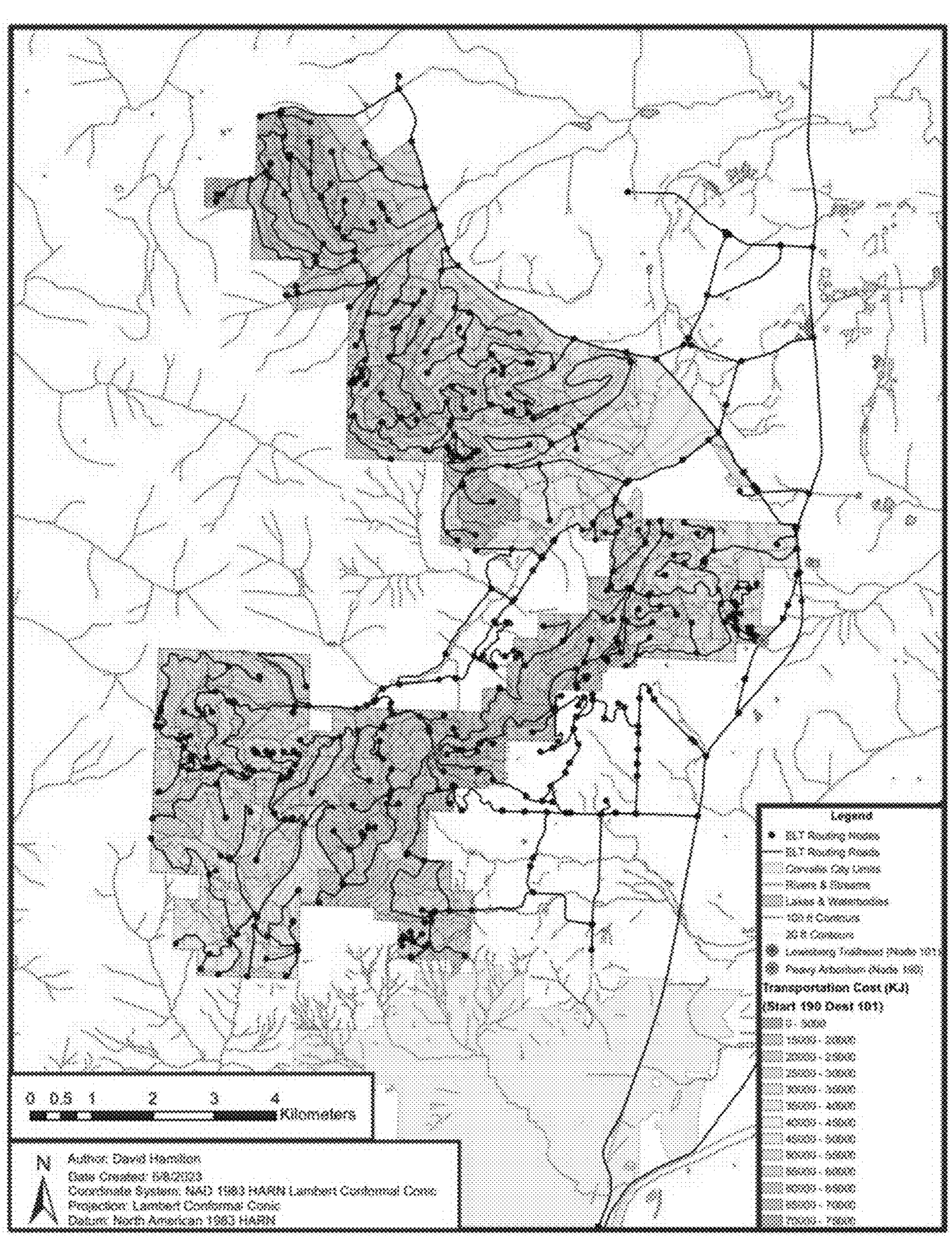
FIG. 4 is an illustration of the map of FIG. 3, in which colors across the landscape are used to depict estimated energy utilization, taking into account estimated energy regeneration production, in accordance with at least one example.

In at least one implementation, as shown in FIG. 4, a map of such a network including the routes may be coded, such as color coded or greyscale coded, to depict estimated energy utilization or expenditure, distances, shortest paths, and energy monetary costs. For example, coding on a display, such as display coupled to computing device 204 may result in a color-coded displayed map of the routes within the network in which estimated energy utilization along the routes within the network may be color coded based at least in part on estimated regenerative production.

As shown, colors may operate as a visual aid to, for example, a route planner. The colors inform the route planner regarding those routes that may be more energy efficient than others, considering regenerative energy production. Although colors are a convenient method of coding, other methods may alternately and/or additionally be employed, such as shading, hatching, gray scale, etc.

Such a map may also be of use to others besides route planners. For example, those in the business of transporting, especially difficult to transport items, such as logs, as one illustration, may employ such a map in connection with an evaluation of and/or a purchase of a heavy-duty electric truck, such as an electric logging truck.

Figure 5:
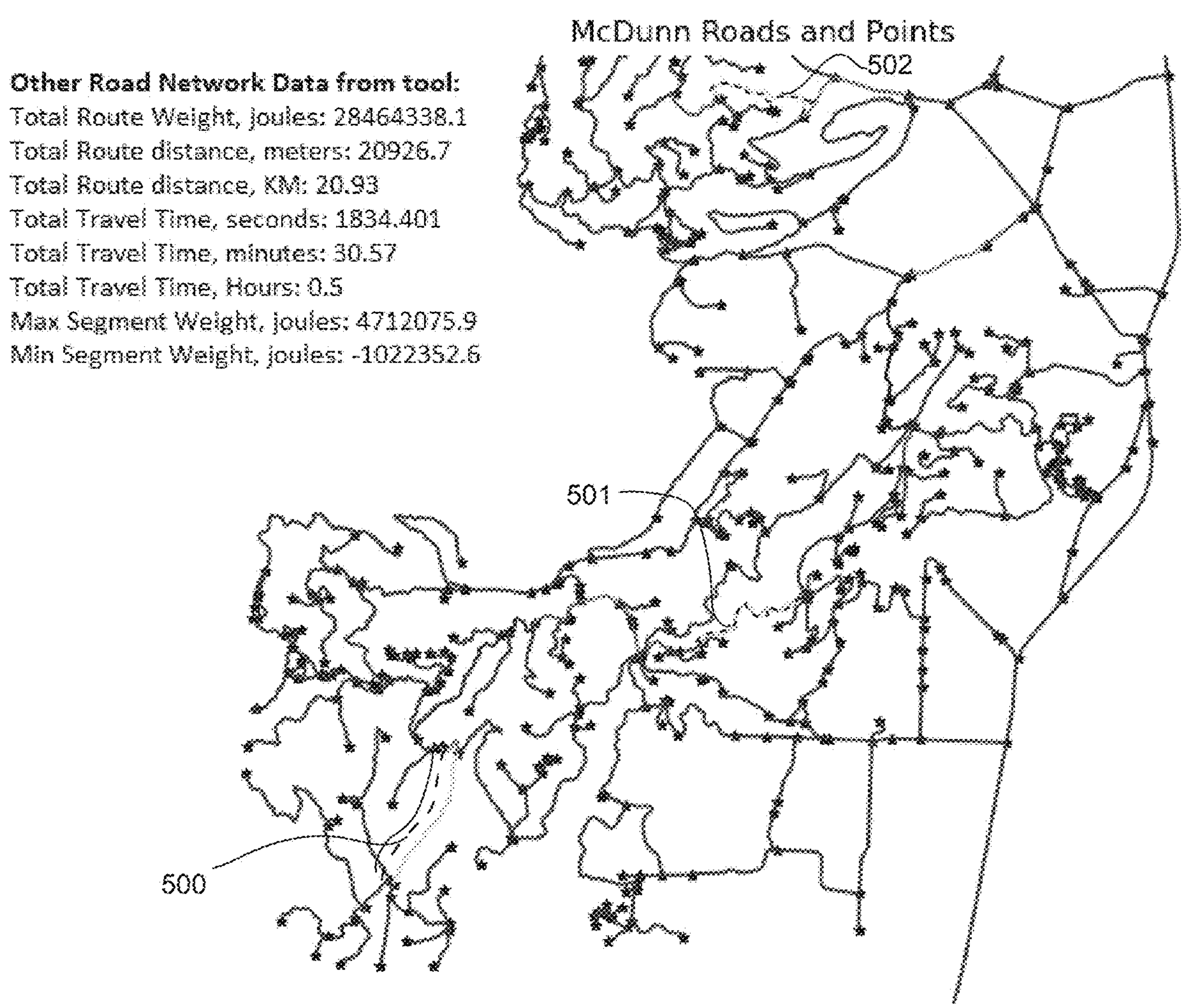
FIG. 5 is an illustration of the map of FIG. 3, in which estimated energy utilization, taking into account estimated energy regeneration production, is employed to select one or more preferred routes for an electric vehicle able to perform energy regeneration production, in accordance with at least one example.

In at least one implementation, in addition to generating an energy utilization map, one or more preferred routes of the available routes shown by a displayed map may be selected based at least in part on estimated energy utilization considering estimated regenerative energy production by a loadable vehicle, such as one capable of regenerative energy production. In at least one implementation, such one or more preferred routes may be highlighted on a displayed map, such as illustrated in FIG. 5 by dashed routes 500, 501, and 502. Thus, FIG. 5 shows the network of routes from FIG. 3 but without the contours, as are shown by FIG. 3 to represent elevation.

Of course, again, claimed subject matter is not limited in scope to illustrative implementations. In at least one implementation, for routes within a network, instead, of a multi-point or multi-route journey, as described above, energy utilization may be estimated for an unloaded loadable vehicle from a start point to an intermediate point within the network and for the unloaded loadable vehicle from that intermediate point to the end point. This estimation may then be performed for a host of respective intermediate points within the network, if not the entire set of intermediate points included within the network. In at least one implementation, because regenerative energy production is included in choosing routing between the start point and the end point, estimated energy utilization may be based at least in part on estimated regenerative energy production along routes by the vehicle between the start point and the end point via any of the intermediate points within the network. Likewise, a similar estimation process from end point to start point of a loaded loadable truck may be performed, in at least one implementation.

To illustrate an implementation more specifically, a process for generating an energy utilization map may include the following. A loadable vehicle and a load may be selected. A multidirectional network of routes for a loaded loadable vehicle and for an unloaded loadable vehicle, in which the routes respectively comprise a series of respective interconnected road segments, may be generated.

For the respective interconnected road segments forming the routes within the respective multidirectional networks, an estimated edge weight calculation for the loaded loadable vehicle and for the unloaded loadable vehicle based at least in part on a set of factors may be performed. Examples of factors may include: estimated regenerative energy production, if any, along the respective interconnected road segments by the vehicle, estimated distance traveled along the respective interconnected road segments by the vehicle, estimated slope (e.g., grade) along the respective interconnected road segments; estimated rolling resistance of the vehicle along the respective interconnected road segments for the vehicle and/or of the road; estimated air resistance along the respective interconnected road segments for the vehicle and/or estimated gravity resistance along the respective interconnected road segments for the vehicle, as week as road material along the respective interconnected road segments, and/or road type of the respective interconnected road, etc.

In at least one implementation, via estimated edge weights of the respective interconnected road segments, the lowest cost and/or lower cost paths, at least in terms of estimated energy utilization, of traveling between a start point and an end point to and from respective intermediate points in the network may be determined. In at least one implementation, one or more preferred routes may be produced while generating energy utilization map using estimates of energy utilization. In at least one implementation, having determined estimated energy utilization between the start point and end point via one or more preferred routes that includes respective intermediate points, a displayed map may be coded to depict estimated energy utilization across the landscape for travel by a vehicle, such as a loadable vehicle, along the one or more preferred routes within the network based at least in part on estimated regenerative energy production.

Thus, for example, to illustrate selection of vehicle and load, a selection may be made from a table, which, in an implementation, may be stored in the memory of a computing device. FIG. 6, for example, includes a table of existing and hypothetical vehicles with hypothetical loads. In the table of FIG. 6, "Tare" refers to the weight of the listed truck as an empty container, whereas "Weight" refers to the weight of the truck including its load from the table. Note also that the table includes for the respective vehicles listed, an estimate of regenerative energy efficiency ("RegenEff" in FIG. 6), an estimate of drive train efficiency ("Powertrain-Eff" in FIG. 6), and an estimate of size of the frontal cross section of the vehicle ("Frontal Area" in FIG. 6). These estimated parameters, for example, may be employed to calculate energy usage estimates to be used as edge weights for edges of a network, in at least one implementation. Hence, to generate FIG. 4, truck model parameters used comprise those shown in Table 1 for example, presented below, for the R500 Tri Drive hybrid electric truck produced by Edison motors. Table 1 has estimates of regenerative efficiency ("Regen Efficiency") in the table and estimates of drive train efficiency ("Powertrain Efficiency"), as well as estimates of tare weight and load weight, as discussed previously with respect to Table 1. The R500 truck comprises a heavy-duty truck configured for forestry operations with a regenerative braking system. The regenerative breaking efficiency estimate typically ranges between 60-80%. Although the vehicle specifications allow for a gross axle rating of 39,000 kg (86, 100 lbs), 36,287 kg (80,000 lbs), was used as an estimate to comply with Oregon truck weight limits.

Likewise, to perform processing to estimate energy utilization, a network representation of a chosen landscape, e.g., a network of routes, in which the selection of preferred routes may take place, for an implementation, is to be constructed, like the network shown in FIG. 1, which may, for example, be done for the landscape illustrated in FIG. 3. In other words, as suggested, a multidirectional network may be constructed, in this example implementation.

Thus, parameter estimates comprise values related to particular routes. This may, in an implementation, include a Digital Elevation Model (DEM) that comprises a representation of the bare ground (bare earth) topographic surface of the Earth excluding trees, buildings, and other surface objects The digital elevation model (DEM) comprises, here, lidar derived raster layers shown in TIFF format, although claimed subject matter is not intended to be limited to this example. There may also be Environment Systems Research, Inc., (ESRI) shapefiles of "harvest polygon units," road polylines and node point files, such as from the GIS database mentioned previously, for the landscape of FIG. 3. It is noted, here, that ESRI shape files associated with GIS are not necessarily limited to harvest polygon units. Rather, in another application, as suggested, such as mining, farming, and/or perhaps mail or package delivery, such files may capture other situations, such as city or country neighborhoods, housing, supply and/or receiving areas, etc. Furthermore, claimed subject matter is not limited to ESRI shape files associated with GIS. Again, this example is provided as an illustration. However, other approaches to capturing features, including parameter estimates of a landscape, useful for routing and/or mapping movement of vehicles, such as electric vehicles, is intended to be included within claimed subject matter.

In at least one implementation, the DEM (e.g., elevation model) may be overlaid on points (e.g., nodes) so that roads from the shapefiles may be used to approximate estimated values for edge connections between nodes (e.g., points). The tables shown below provide one illustrative example of how this may be accomplished in at least one implementation. It is noted, of course, that other ways of constructing a network may be employed and this is merely provided as one illustrative implementation.

In at least one implementation, these tables may be constructed from the DEM and ESRI shape files, and may be used in conjunction with GIS software, for example, to display routes for a chosen landscape (e.g., network of routes). "Harvest unit" (e.g., harvest polygon unit or harvest unit polygon) is a term of art and refers, in general, to an area of land from which timber may be harvested. In at least one implementation, harvest units comprise polygon shaped areas included in the ESRI shape files. Table 4, for example, illustrates a table of nodes (e.g., "Node ID") at particular elevations (e.g., "Elev_meter") connected by edges (e.g., "Road_Edge 1", "Road_Edge 2", etc.) which, again, represent roads for this illustration. Table 3 then tabulates road condition type estimates (e.g., "ROAD_Class", "Surface_Type", "Length_Meters", "Rolling_Resistance", "Velocity") associated with particular edges, to be used to perform calculations, such as illustrated in FIG. 7, which relate to calculation of estimates for edge weights.

Here, the lidar measurements used to derive the DEM were acquired from an airborne platform. Elevations in the area of interest appear to range from 58 to 650 meters with an accuracy of 75 cm (horizontal) and 30 cm (vertical). Likewise, to generate FIG. 4, the DEM was also trimmed to remove segments outside the area of interest. In addition, harvest polygon units in the ESRI shape files were also trimmed to improve visualization and were split if a harvest polygon unit could access multiple harvest landings. The trimming process also added nodes identifying road segments where energy regeneration is possible. Road lines in the ESRI shape files were also split at intersections and harvest landings and those split locations along with the end point of the road line were saved as node points. Surrounding highway and road networks were included to access harvest polygon units with harvest landings inaccessible to the road network inside the forest. Velocity of a vehicle used to generate FIG. 4 for a road segment, such as shown in Table 3 below. Velocity data typically comprise the designated speed limit for the road, if one is available.

The node points were assigned an elevation value by overlaying the DEM content. Attributes of the nearest harvest landing were assigned with respect to the harvest polygon unit. Road length attributes were calculated using the trimmed files. Estimated rolling resistance (e.g., "rolling resistance" in Table 3) coefficient values were assigned to segments in accordance with road material ("Surface type in Table 3). For example, the estimated rolling resistance coefficient attribute of a normal force was set to 0.013 kg/kg for paved concrete and was set to 0.018 kg/kg for gravel using estimates from the Logging Road Handbook, Byrne, J. J.; Nelson, R. J.; Googins, P. H. Logging Road Handbook: The Effect of Road Design on Hauling Costs 1960. These are then used to estimate rolling resistance of a vehicle over roads of that surface type in an implementation, such as illustrated by FIG. 7, for example.

After vehicle and load selection, and construction of a multidirectional network for respective vehicle types (e.g., in this illustrative implementation, a loaded vehicle and an unloaded vehicle), edge weight estimates ("Edge weight" in FIG. 7) may be calculated substantially in accordance with the formulas of FIG. 7. Edge weight estimates, in at least one implementation, may be determined in accordance with a set of equations that comprise a modified version of formulas developed by Sessions and Lyons, see Sessions, J.; Lyons, C. K. Harvesting Elevation Potential from Mountain Forests. *International Journal of Forest Engineering* 2018, 29, 192-198. The formulas factor in estimated air resistance of a vehicle (e.g., "AR" in FIG. 7), estimated rolling resistance of a vehicle (e.g., "RR" in FIG. 7)) and estimated gravitational resistance of a vehicle (e.g., "GR" in FIG. 7) measured in joules. The detailed formulas for this illustration are provided in FIG. 7. It is noted that these formulas may accommodate vehicles with regenerative braking (e.g., "Regen Efficiency" in FIG. 7), but do not account for effects of limited battery capacity on energy utilization. Therefore, claimed subject matter is not limited in scope to these exact formulas. More complex or simpler formulas may be employed in other implementations of claimed subject matter. For example, formulas may accommodate vehicles without regenerative braking and/or may account for the effect of battery capacity for use in an implementation. More complex models may also consider other factors that may affect energy utilization estimation, such as harnessing solar power along a trip, as an example, and/or other factors as described below.

The logic associated with calculation of estimates for edge weights for this illustration may be inferred from the formulas. In particular, regenerative efficiency (e.g., estimate "Regen Efficiency" in FIG. 7) may typically occur in situations in which force due to gravity resistance of a vehicle (e.g., estimate "GR" in FIG. 7) overcomes force due to air resistance of a vehicle (e.g., estimate "AR" in FIG. 7) and rolling resistance of a vehicle (e.g., "RR" in FIG. 7). However, such energy may not be perfectly recaptured. In at least one implementation, the formula includes a factor to show that an estimated percentage (e.g., "Regen Efficiency" in FIG. 7) of this regenerative energy is lost. In at least one implementation, the calculation also employs an estimate of rolling resistance due to the road material ("Rolling Resistance"), which may be used in conjunction with an estimate of slope (e.g., "Theta" in FIG. 7), an estimate of distance for a road segment (e.g., "Edge Length" in FIG. 7), and an estimate of truck weight (e.g., "Truck Weight" in FIG. 7) to compute an estimate of rolling resistance (e.g., "RR" in FIG. 7) for a vehicle, in this implementation. Additional parameters employed to calculate estimates of edge weights include an estimate of truck velocity ("Velocity" in FIG. 7), an estimate of drive train efficiency (e.g., "Power train efficiency" in FIG. 7), and an estimate of frontal area (e.g., "Frontal Area" in FIG. 7).

In at least one implementation, having selected the vehicle and load, estimates as edge weights for two networks, one in which a vehicle is loaded and another in which a vehicle is unloaded, may be calculated. The edge weight estimates, after computation, may then be employed in a further computation for estimated energy expended or regenerated across a road segment if the selected vehicle with the selected load, for example, were to traverse the road segment.

In at least one implementation, an energy utilization map may be generated using a start point and end point, along with the various parameters and derived values discussed, such as the estimates to be used as edge weights. As suggested, in this illustration, a constructed network represents a forest landscape. The harvest polygon units of the forest landscape include harvest landings which represent locations within the harvest unit at which a truck may stop and/or turn around. These harvest landings are depicted as intermediate points within the network to which a vehicle may travel. Thus, in theory, an unloaded vehicle may traverse roads of the network to reach a selected intermediate point, such as a particular harvest landing, from a start point. Likewise, the vehicle may traverse roads from the intermediate point, such as the particular harvest landing, to reach the end point. However, there are a variety of routes that may be selected to travel from the start to this intermediate point and then from this intermediate point to the end point. In at least one implementation, a process, referred to the Bellman-Ford process or algorithm, may be employed to select a preferred route, or one or more preferred routes, from the available alternative routes from the start point to the end point via this intermediate point based at least in part on estimation of energy utilization at least considering estimated regenerative energy production for an unloaded vehicle.

Dijkstra's algorithm may be used for determining the shortest path distance or least costly path to travel between a source node and destination node in an edge network comprising multiple nodes and interconnecting edges. A principal difference between the Bellman-Ford algorithm and Dijkstra's algorithm is that Dijkstra's algorithm may overlook the shortest path between source and destination nodes in a network having negative edge weights. This is because the edges having a negative edge weight may not be evaluated, due to the manner Dijkstra's algorithm operates. Dijkstra's algorithm does not readjust (e.g., relax) edge distances once a node is evaluated (e.g., visited node). The algorithm returns the shortest path based on visiting nodes only once. This procedure may overlook edges having a negative edge weight if a visited node to which the edge is connected has at least one other connected edge that has a positive edge weight. For example, the node may be visited by travelling from a previous node along an edge that has a positive edge weight. Once the node is visited, the negative edge will simply be ignored. This may be a limitation in Dijkstra's algorithm that precludes its evaluation of networks comprising negative edge weights. In this instance, an edge weight is energy consumption along road segments interconnecting adjacent nodes. A negative edge weight may result from regenerative braking by an EV, for example, where the net energy consumption along a particular edge is negative due to mechanical recharging of the EV battery.

The Bellman-Ford algorithm, on the other hand, evaluates all edges and readjusts distances to each node in a network at least n−1 times, where n is the number of nodes in the network. The n−1 number of relaxations, or readjustments of distances between nodes to find the shortest path, guarantees that all edges are evaluated, including negative edges, a procedure which may revisit some nodes multiple times. Dijkstra's algorithm may not have this constraint and may stop evaluating nodes when it deems all nodes visited just one time each, frequently overlooking the negative edges.

This may result in an erroneous selection of a path that is not the shortest one. Thus, while other suitable algorithms are also available, Bellman-Ford is frequently applied to networks having negative weights. It is noted in passing that many route optimization routines employ Dijkstra's algorithm or similar and may not consider regenerative braking to determine the most energy-conserving, thus most economical, path. Thus, these routines may return inaccurate data in terms of most economical route selection, for example, identifying or selecting a route that is not truly the "shortest", but erroneously regards it as such.

A similar approach, then, may be employed for a return trip of the vehicle after being loaded. Again, in theory, a loaded vehicle may traverse roads of the network to reach a selected intermediate point, such as a particular harvest landing, from the end point. Likewise, the vehicle may traverse roads from that intermediate point to reach the start point. However, again, there are a variety of routes that may be selected to travel from the end point to this intermediate point, which comprises a particular harvest landing, and then from this intermediate point to the start point. Thus, the same process, the Bellman-Ford process or algorithm, may be employed to select one or more preferred routes of the available alternative routes from the end point to the start point via this intermediate point based at least in part on estimated energy utilization considering regenerative energy production for a loaded vehicle. Advantages of using the Bellman-Ford process over other approaches include its ability to handle directional edges in a network of nodes and edges (and also its ability to handle negative edge weights as already noted). Thus, this calculation may be performed for the available intermediate points within the network in the manner described.

Ultimately, as result of such a process, using the Bellman-Ford results, a preferred route or a few preferred routes to travel between the start point and the end point, where multiple routes may be ranked according to energy utilization, for example (and a preferred route or a few preferred routes from the end point to the start point) may be identified, which may be highlighted on a displayed map, such as a map generated and displayed using the ESRI shape files and DEM content with some adjustments as previously discussed, for this implementation. In addition to an estimation of energy utilization, likewise, an estimate of travel time and travel distance may also be calculated, as well as other potentially useful estimates in at least one implementation.

In an implementation using the Bellman-Ford results, routing and estimated energy utilization for travel between the start point and the end point via the respective harvest landings of the respective harvest polygon units of the network may be identified. Thus, a map may be generated on a display coupled to a computing device, such as shown in FIG. 3, again, here, from ESRI shape files, also showing road lines and node points, and also using elevation estimates from DEM values, in which the harvest polygon units may be coded, such as color coded, to depict an estimate of energy utilization for travel between the start point and the end point via a particular harvest polygon unit, as shown in FIG. 4.

Figure 11A:
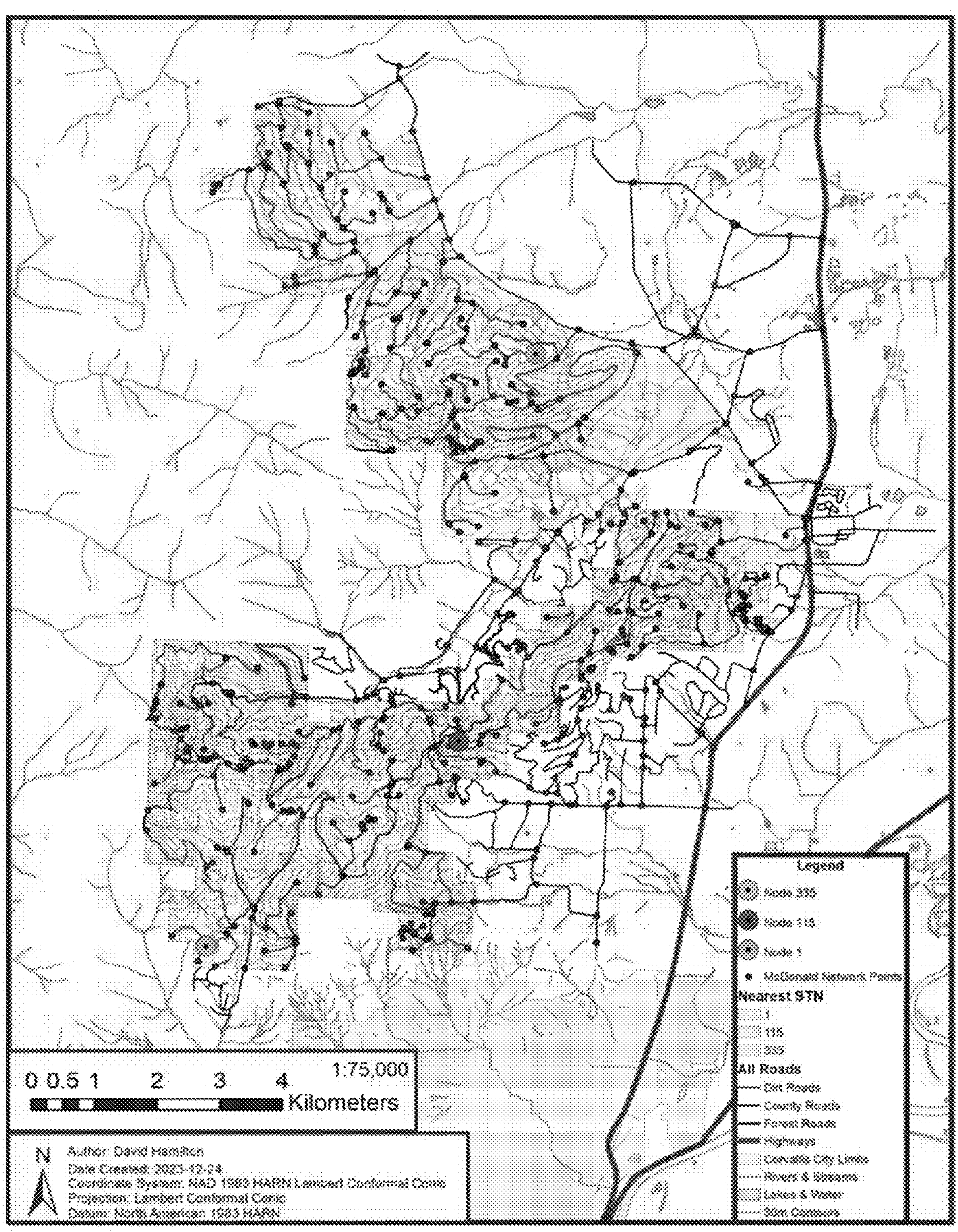
FIG. 11A illustrates a forestry landscape showing locations of charging stations for electric trucks configured to haul logs, in accordance with at least one example

In at least one implementation, estimated energy utilization for a route that includes a particular harvest polygon unit may be used to determine color. Thus, in FIG. 4, the harvest polygon units are colored based on estimated energy utilization (e.g., kilojoules, kJ) for an empty R-500 Tandem ELT traveling from the Lewisburg Trailhead to the particular harvest polygon and then traveling back loaded to the Peavy Arboretum. In FIG. 11A, on the other hand, the harvest polygon units are colored based on estimated energy cost utilization (e.g., in USD) for an empty R-500 tandem ELT traveling from the Peavy Arboretum to the harvest polygon and then traveling back loaded to the Lewisburg Trailhead. A benefit includes that such a map makes readily apparent those areas that produce more energy efficiency if traveled compared to those areas that produce less energy efficiency if traveled. For example, based on the color-coded maps presented in FIGS. 11A-C, different routes may be selected for the return trip from Peavy Arboretum to the harvest polygon to the Lewisburg Trailhead than were taken for the starting journey between Lewisburg Trailhead and the Peavy Arboretum (based on FIG. 4).

Although claimed subject matter is not limited in scope in this respect, at least one implementation may include a variety of additional or alternative features. For example, implementation on a smart phone or a tablet, for example, may permit a driver of a loadable vehicle (e.g., a user) to select from a menu of available options, which may include, vehicle selection, load selection and/or selections of start and end points. Likewise, at least one implementation may permit selection of other factors that may be used in conjunction with calculations, such as those previously described. These may include various contingencies, such as a maximum trip or route distance, maximum travel time and/or maximum cost, as examples. Cost may refer to estimated energy utilization, but may include additional elements, such as estimated cost of labor, estimated equipment wear and tear, etc. Typically, a system on board a vehicle, which, again, in at least one implementation, may comprise a smart phone, may display on a graphical user interface, for example, for a user, one or more preferred routes, potentially with calculation results so that a user may select considering tradeoffs, such as estimated energy utilization versus estimated travel time, as examples. Likewise, in at least one implementation, an on-board system may include a GPS position-location system to locate the vehicle and track movement along a selected, preferred route.

In at least one implementation, a system may be at least partially cloud based, such as a network in the cloud (this network, again, may comprise a computing and/or communications network, which is distinguished from the previously described network of routes across a landscape). In at least one implementation, such as the foregoing, one or even a fleet of vehicles may respectively include a GPS tracking system and wireless network connection for use in tracking and/or scheduling movement of various vehicles in the fleet along various selected preferred routes for those vehicles. At least one implementation may comprise a database, accessible via network wireless connections, for example, to assist in managing such tracking and/or scheduling of a fleet of vehicles. In at least one implementation, additional features may be available via network connections, for example, possibly in association with a tracking database, with such features integrated into a system, to optionally provide weather reports, traffic reports, road work reports, etc., typically, as real-time updates, to further facilitate tracking and/or scheduling of vehicle movements, such as multi-vehicle movements.

In at least one implementation, a vehicle might also include a solar panel, for example, and use solar energy to potentially increase the effective range of an electric vehicle, such as an electric logging truck. In at least one implementation, one might also include real-time weather reports and/or real-time traffic reports to assist in routing and/or scheduling associated with an implementation that also captures solar energy. In at least one implementation, edge weight estimates may include estimates of energy captured via solar power generation. Hence, routing and/or map generation may be implemented that includes this feature.

In at least one implementation, generation of an energy utilization map and/or selection of one or more routes based at least in part on estimated regenerative energy production along various routes may be performed in a manner to potentially trade off other additional factors beyond estimated regenerative energy production that may affect selection of a route, such as estimated distance, estimated travel time and/or other estimated costs beyond the cost of estimated energy use for a particular trip along a particular route. As a simple example, if estimated travel time is expected to be no more than 100 minutes then only routes estimated to be within 10% or 110 minutes might, for example, be feasibly considered.

At least one implementation may be general enough to account for energy utilization by one or more vehicles without regenerative energy production, such as vehicles fueled by hydrocarbons like diesel and/or other vehicles operating on electric power supplied by a charged battery. It is noted that computation of edge weights may in such an implementation be modified to produce different estimates for the edge weights so that a network of routes for such a scenario, may, instead, consider fuel and/or charge consumption along various routes without consideration of regenerative energy production for a particular vehicle.

Figure 8:
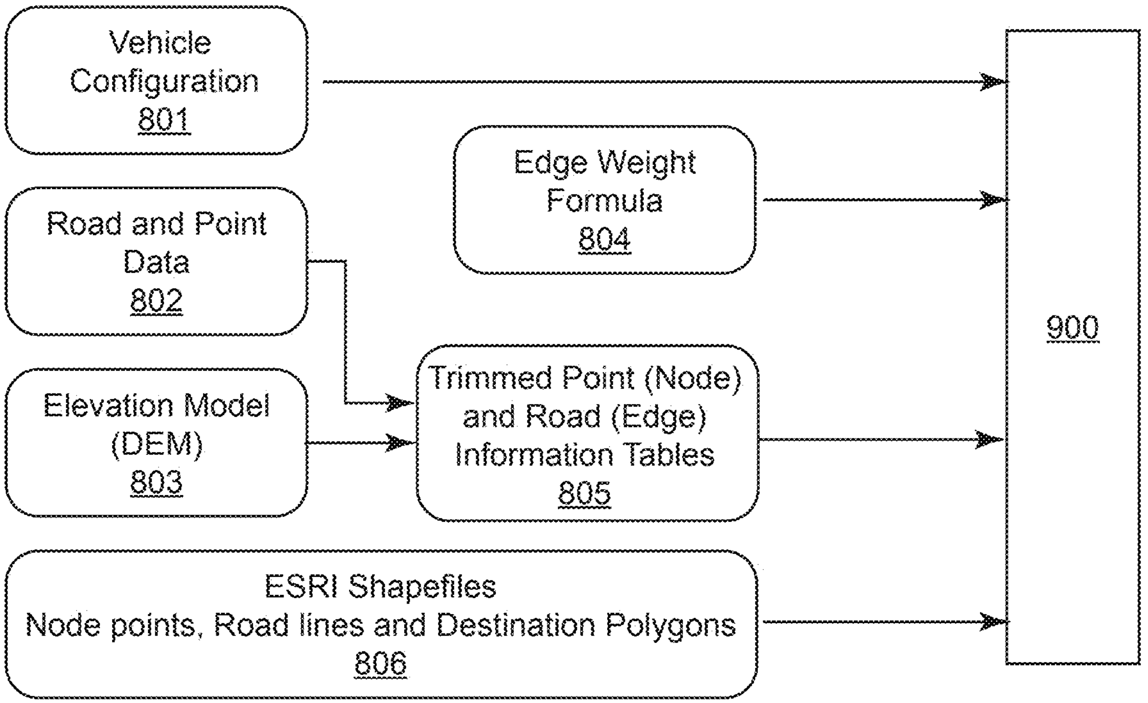
FIG. 8 illustrates a flowchart for data inputs to an energy routing software computational engine, in accordance with at least one example.
Figure 9:
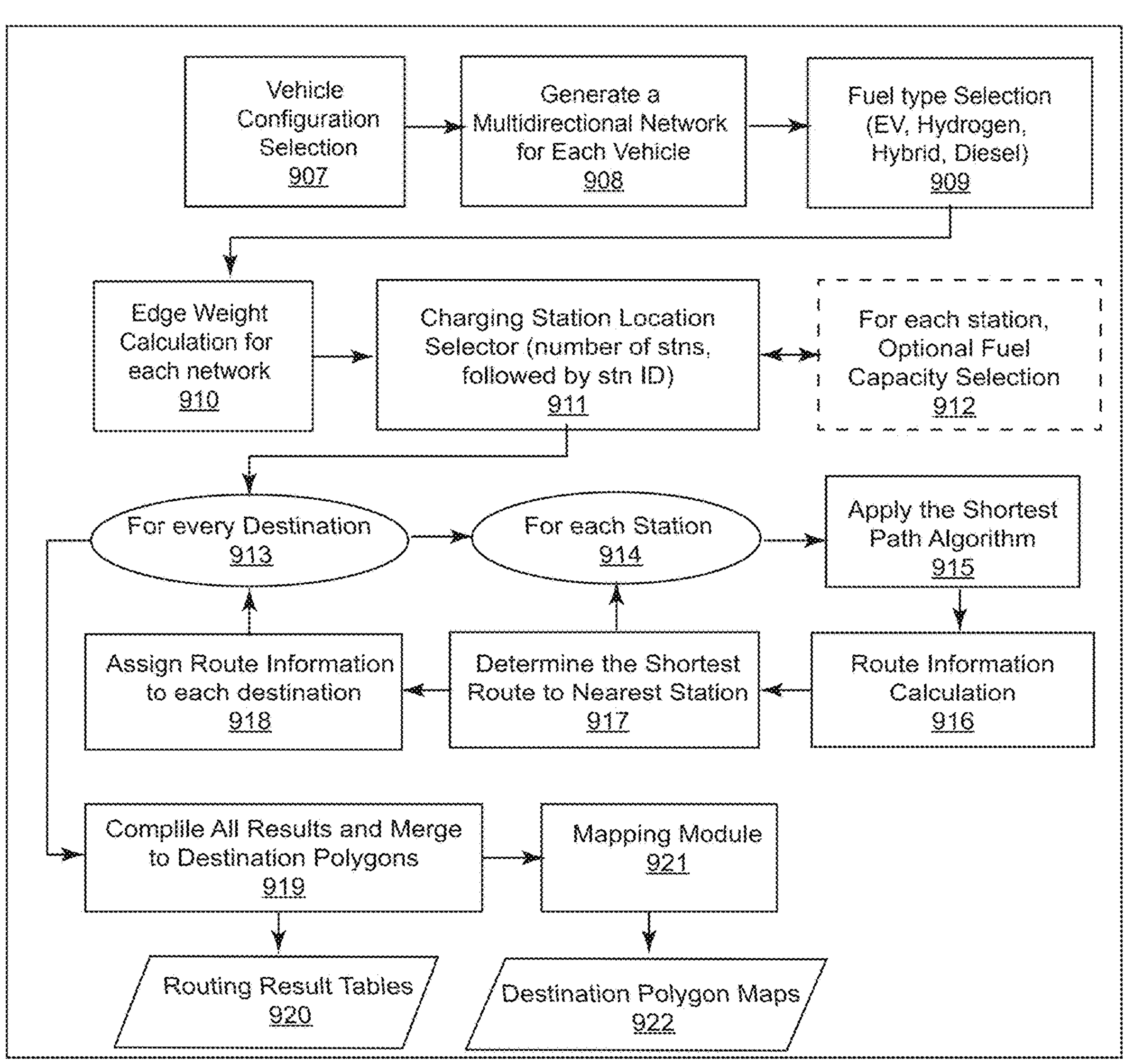
FIG. 9 is a flowchart of an energy routing software computational engine for generating a map of energy utilization, in accordance with at least one example.

FIGS. 8 and 9 illustrate flowcharts illustrating configuration implementations for inputs flowchart 800 and energy routing software computational engine 900, respectively, of the energy routing software (e.g., energy routing software computational engine 215 depicted in FIGS. 2B and 2C) in accordance with at least one implementation. Energy routing software may be incorporated into a software and hardware package dubbed "BEVER Tool", where BEVER is an acronym for "Battery-Hybrid Electric Vehicle Energy Routing". Thus, as previously discussed, various parameters may be provided to facilitate determinations and/or estimates to be made in accordance with claimed subject matter, such as for some implementations, selection of one or more preferred routes and/or generation of a map of energy utilization for routes across a particular landscape.

Starting with FIG. 8, inputs flowchart 800 shows a group of input blocks 801-806 feeding data to energy routing software computational engine 900, described in detail below in reference to FIG. 9. In at least one implementation, block 801 in FIG. 8 depicts selection of a vehicle configuration and load as discussed previously. At least one implementation may handle an electric loadable vehicle without a load and an electric loadable vehicle with a load. Such data are tabulated in Table 1, shown below.

TABLE 1

Sample vehicle configuration data

| Truck # | Truckname | Weight (kg) | Tare (kg) | Load (kg) | Eff (PTrain + Engine) | Regen Eff | Frontal Area (m2) | Engine Eff | PTrain Eff |
|---|---|---|---|---|---|---|---|---|---|
| 1 | e-truck | 31,287 | 16,287 | 15,000 | 60% | 70% | 7.43 | 80% | 75% |
| 2 | diesel | 26,287 | 16,287 | 10,000 | 36% | 0 | 7.0 | 45% | 80% |

Blocks 802 and 803, for this implementation, depict an elevation model, DEM, and road and point parameters or attributes useful for constructing a network of routes. For example, road and point parameters in block 802 may be loaded as road and point data tables as exemplified by Table 3, presented below. As explained in detail above for this implementation, and as depicted by block 805, so-called "trimming" may be applied to the foregoing. As previously discussed, ESRI shape files may be derived from GIS data. By utilization of the ESRI data, geographical and/or topological values, including harvest polygon units and harvest landings, can be used for assembling a network of routes. Such routes may be assembled into a multidirectional network of routes, for example. Furthermore, block 804 depicts use of a set of formulas, shown, for example, in FIG. 7, for an implementation, that may be used to compute estimates of edge weights, related to estimates of energy lost or gained by traversing a particular edge as part of a route.

Referring now to FIG. 9, having, thus, acquired the foregoing for use in performing processing, in flowchart for energy routing software computational engine 900, for each direction traveled, vehicle and/or load selection, such as for a heavy-duty electric truck and/or ICE vehicle, such as a diesel truck or a gasoline-powered SUV, a hybrid SUV or sedan car, loaded or unloaded for an implementation, may occur as depicted by block 907. The choice of an ICE vehicle may be made in comparison to an EV vehicle (e.g., an E-truck or an ELT) traversing the same route.

At block 908, as previously described, one or more multidirectional networks of routes for selected vehicles may be constructed, such as a network for an unloaded loadable electric vehicle and/or ICE vehicle (e.g., diesel truck) and a network for a loaded loadable electric vehicle and/or ICE vehicle. For example, in a multidirectional network, some routes may be suitable for a particular type of ELT (or E-truck for general hauling, for example) to travel most economically from a starting node to a destination when loaded. Other routes within the same network may be suitable for the same ELT or E-truck to travel most economically from the destination back to the starting node when empty. For example, some routes having more downhill grades may offer opportunities for more regenerative braking than others. In another example, an unloaded E-truck may travel more economically along a route that is not paved in comparison to an alternate route that is paved (e.g., a highway). In contrast, the same ELT or E-truck when loaded may have a gross weight that is triple the unloaded gross weight of the ELT or E-truck (e.g., the net weight or tare). Thus, the return trip may be more economically traversed by the paved highway, given the road conditions. In at least one implementation, reasons for choice of alternate routes to be chosen for the forward and return directions may be changes in weight of the ELT or E-truck due to load and empty gross weights, changes in frontal area due to, for example, unhitching of a trailer or offloading of logs, changes in length or configuration of the ELT or E-truck, again due to hitching and unhitching of any trailers, and changes in power supply or fuel, for example hybrid systems or battery swap.

A fuel type or power generation type may be selected by block 909, such as for example, battery, hybrid, gasoline, hydrogen, diesel, etc. Edge weight calculations, such as according to the set of equations shown in FIG. 7 and computed by block 804, to obtain estimates to be used as edge weights for the constructed networks may be performed, such as by block 910. For this implementation, estimated energy utilization based at least in part on estimated regenerative energy production may be a cost of traversing a particular edge of the constructed network, reflected via a calculated estimate for an edge weight. As previously discussed, however, cost may be generalized, for other implementations, to consider more factors in addition to estimated energy utilization based at least in part on estimated regenerative energy production. For example, estimated travel distance, estimated travel time, and/or estimates of other costs, such as labor, wear, and tear, etc., may also be factors used to determine estimates to be used as edge weights for other implementations. At block 910, start and end points for the networks may be selected.

In at least one implementation, for respective networks for respective vehicles, processing may be performed across a list of stations, where a station may include charging stations and/or fueling stations (e.g., gasoline/diesel) chosen in or near a landscape, performed by block 911. In at least one implementation, stations may also include harvest polygons and other nodes, such as loading, unloading, personnel stopover and supply retrieving locations. For example, a list of suitable stations and their identifying data may be input by the user or generated by internal tables in block 911. In at least one implementation, a maximum fuel and/or battery capacity for each station and/or vehicle may be input at block 912. The latter option may help determine maximum range and accounts for replaceable batteries or fuel/battery capacity.

Consequently, processing is performed for a respective station location. In an example of potential routes through a network of routes, a preferred route, in accordance with estimated energy utilization based at least in part on estimated regenerative energy production, viewed here as "cost," in at least one implementation, may be determined from the start point to the respective station location and from the respective station location to the end point. Likewise, the cost may be determined from the end point to the respective station location and from the respective station location to the start point. For example, a loadable vehicle may be empty in one direction, such as from start point to end point, and loaded in the other direction, such as from end point to start point. In at least one implementation, cost may be generalized to consider more factors in addition to estimated energy utilization based at least in part on estimated regenerative energy production.

Returning to FIG. 9, blocks 913 and 914 represent nested for loops, where the for loop of block 914 is nested within the for loop of block 913. The for-loop of block 914 includes blocks 915, 916, and 917. The for-loop of block 913 includes block 917 and block 918. In at least one implementation, input from the program to block 913 includes at least one destination on a particular landscape, and one or more stations in a list of stations fed by block 911. In at least one implementation, the stations are user-defined. In at least one implementation, the outer for-loop of block 913 iterates for each destination, where the inner for-loop of block 914 iterates for each station in the list of stations. In at least one implementation, stations may include any combination of charging stations, fueling stations, and other types of nodes including harvest polygons or other data.

To determine at least one preferred route within block 914, for example, a "shortest" path in terms of "cost," may be determined using a shortest path finding process, depicted by block 915. In at least one implementation, block 915 may employ the Bellman-Ford algorithm to find the shortest path in terms of energy utilization for a particular starting point and destination. While the Bellman-Ford algorithm may be used in this exemplary implementation, other algorithms for finding the shortest path and consider negative edge weights may be employed. Again, benefits of using Bellman-Ford over other known processes for finding a shortest path include its ability to handle directionality along an edge segment of a network and its ability to handle negative weights, used to reflect energy gained rather than energy lost, in an implementation, for example.

For respective stations, the "shortest" path (or "shortest" paths, for example) may be determined, thus, providing one or more preferred routes with respect to a particular station, in this implementation. Data from blocks 801-806 may be incorporated into blocks 910 for calculating edge weights. For each iteration of block 914, edge weights for edges may be fed into block 915 to determine the shortest path results. Results from block 915 are fed into block 916 for route information calculation. In at least one implementation, block 916 determines an optimal route economically, which may include mapping the shortest route in terms of physical distance. In at least one implementation, block 916 may calculate energy costs, travel time, and travel distance. Once these parameters are calculated, the nearest station for each destination is determined by block 917. Followed by this procedure is the compilation and assignment of route information for the closest user-defined station to each destination in block 918. Once all iterations are completed for each destination, the for-loop of block 913 may terminate and return program control to block 919, as shown. In at least one implementation, as depicted by block 919, for respective stations, results, such as estimated energy utilization, estimated time, estimated distance, etc., may be compiled to be associated (e.g., merged) with particular stations.

In at least one implementation, the merged results from block 919 are used to create a routing result output table as shown in block 920, for example, as a spreadsheet file, and initiates the mapping module in block 921. At block 920, a table of routing results, for example, for the respective stations (e.g., charging stations), may be produced. In at least one embodiment battery/gas tank load and comparison between EVs, Hybrids and ICEs may be included. Thus, for the routes of the network across a particular landscape, over the set of respective charging stations, one or more preferred routes from the start point to the end point may be selected and one or more preferred routes from the end point to the start point may be selected, using such results. In at least one implementation, the mapping module in block 921 plots the node points, road one and station/destination polygons and may be used to generate a map, such as shown in FIG. 3, on a display coupled to a computing device, which, for example, may include a smart phone, a tablet, or a touch enabled, full color computer display, etc.

Figure 11B:
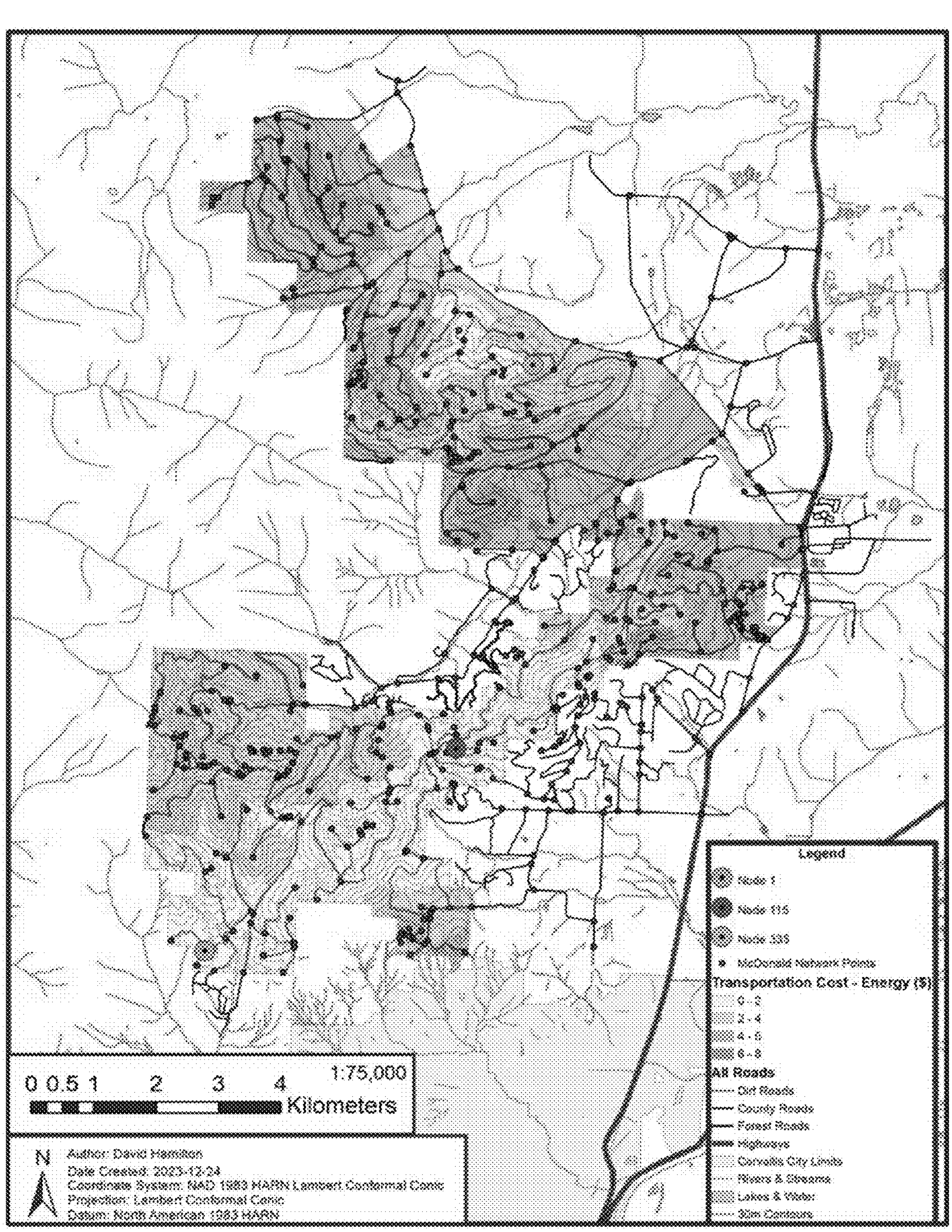
FIG. 11B illustrates a color-coded map generated by the energy routing software computational engine shown in FIG. 9, in which colors across a forest landscape are used to depict estimated energy monetary cost for an e-truck travelling to the nearest charging station taking into account estimated energy regeneration production, in accordance with at least one example.
Figure 11C:
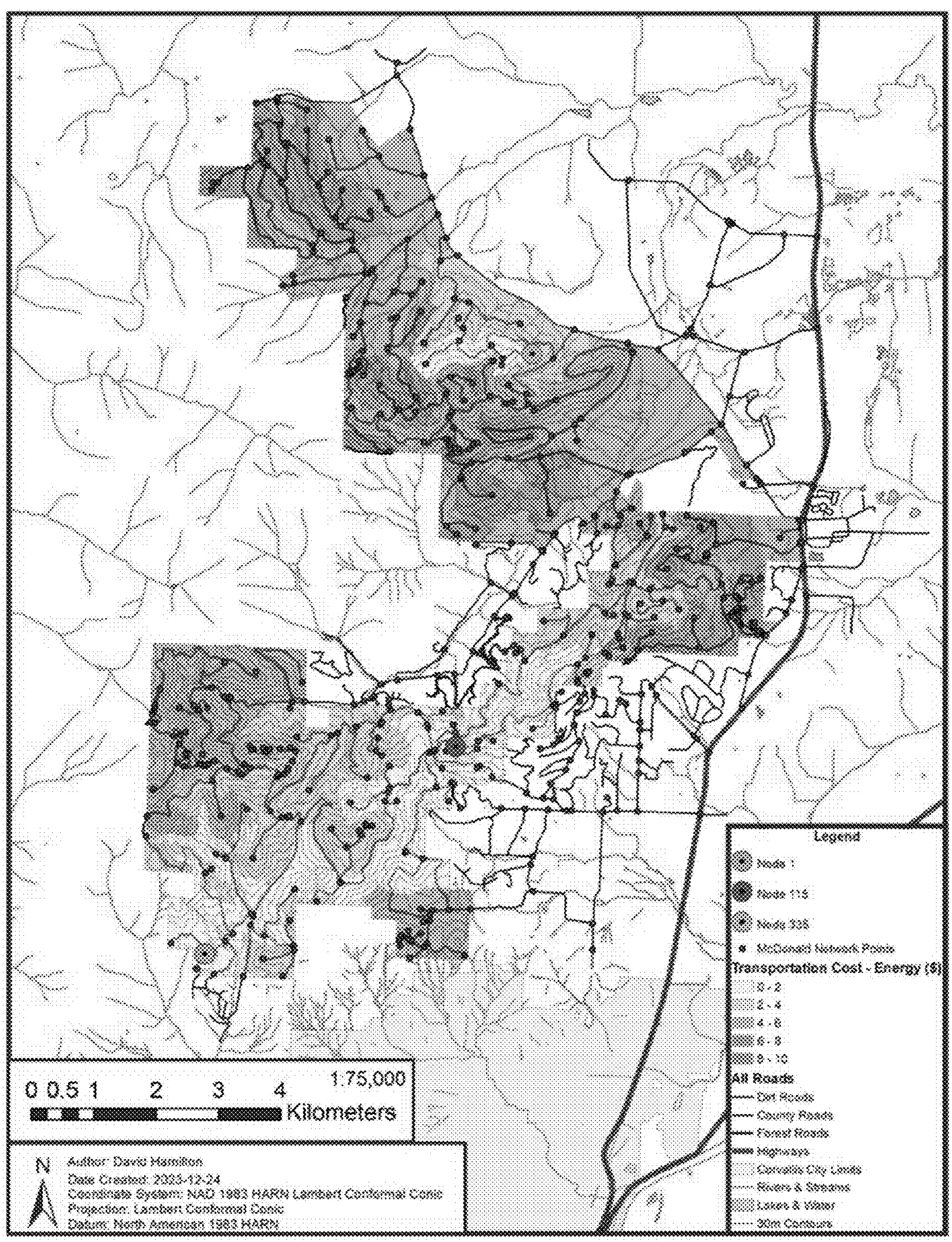
FIG. 11C illustrates a color-coded map generated by the energy routing software computational engine shown in FIG. 9, in which colors across a forest landscape are used to depict estimated energy monetary cost for a diesel truck travelling to the nearest fueling station, in accordance with at least one example.

Block 922 may comprise a branch or function of the mapping module in block 921 which depicts a module to color the polygons, for example, based on any route data generated in the foregoing blocks. In at least one implementation, map colors, such as depicted in FIGS. 11B and 11C in greyscale, may be associated with parameters such as the nearest station, total energy expenditure (e.g., in kJ), energy expenditure as a function of distance (e.g., in kJ/km), energy monetary cost (e.g., in dollars or other suitable national currency), time measured in hours and minutes, physical distance (e.g., km, miles), man-hour cost (monetary), total monetary cost, carbon/emission expenditure (e.g., tons). In at least one implementation, with respect to a particular harvest polygon unit, color may be used to represent a graduated estimate of total energy utilization for a preferred route from start point to end point and from end point to start point via the particular harvest polygon unit. In at least one implementation, with respect to a particular harvest polygon unit, color may be used to represent a graduated estimate of total energy utilization as a function of distance for a preferred route from start point to end point and from end point to start point via the particular harvest polygon unit.

Figure 10:
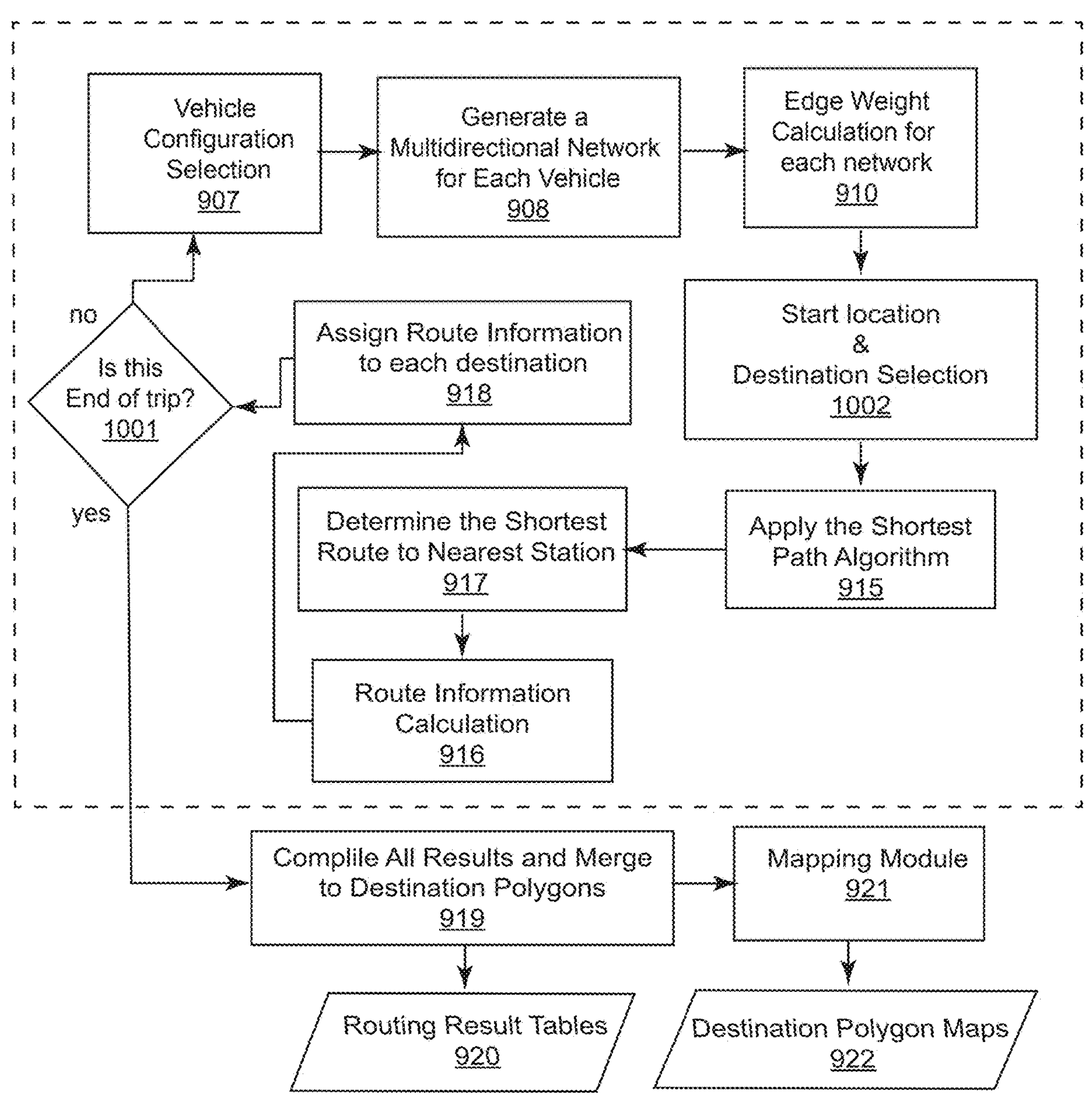
FIG. 10 illustrates a flowchart of a method implemented by the energy routing software computational engine for generating a routing map, in accordance with at least one example.

FIG. 10 is a flowchart illustrating an implementation 1000 of the energy routing software computational engine 900 shown in FIG. 9, in accordance with at least one implementation. Reference numerals of FIG. 10 that correspond to reference numerals of FIG. 9 depict blocks that perform operations the same as or similar to the operations described with respect to FIG. 9. However, the overall arrangement differs in several respects to permit estimating energy utilization in a situation that may include multiple loads with multiple stops typically to increase or decrease the load.

As simply a non-limiting illustrative example, one route may be referred to, here, as a trip because it may include several stops. For example, the vehicle may route from a start point unloaded to a first intermediate point where the vehicle may be partially loaded with timber, the vehicle may then route to another possible, second intermediate point and may be loaded with more timber. The vehicle may then route to the endpoint and be unloaded. Alternatively, for this trip, the vehicle may route to a third, intermediate point and be partially unloaded, before travel to the end point, where it may be completely unloaded.

Although the trip route, as just described, refers to a start point, an end point and several intermediate points, in an implementation, as illustrated by FIG. 10, operationally, to perform the appropriate processing, the route is broken up into several initial or start locations and several destination locations in which the load of the vehicle moving between those locations varies. Using the illustrative example above to demonstrate the operation of such an implementation, the process begins with the route from start point to the first intermediate point with a loadable vehicle that is unloaded. Referring to FIG. 10, the process from block 907 to block 918, as well as decision block 1001 and start location and destination selection block 1002, are shown within the dashed outline to delineate a loop that is repeated multiple times. In at least one implementation. decision block 1001 is interrogated at the end of each iteration of blocks 907 through block 918 to determine if the end of the trip has been reached. If yes, the loop will terminate. The process depicted in FIG. 10 is quite like the process for those blocks described with reference to FIG. 9, whereby for-loops in blocks 913 and 914 function in a similar manner. At decision block 1001, the question is whether the process has reached the ultimate final destination (i.e., "End of trip?"). Decision block 1001, therefore, asks: "is this End of trip?" For this example, it is not, so then the process moves to block 907. Because at the first intermediate point, the vehicle is partially loaded with timber, at block 907, choices are made to reflect this load, such as altering truck weight (e.g., "Truck Weight" in FIG. 7), which impacts the process from block 907 to block 918, such as the calculations to estimate edge weights, at block 910, for example.

In at least one implementation, at block 1002, for the starting location, the first intermediate point is used and, for the destination location, the second intermediate point is used. The process then is performed again, with estimates and results accumulated and compiled, etc. After block 918, for this implementation, again, at block 1001, the question is whether end of trip is reached? Because it is not, the process returns to block 907, although now the truck weight is again modified to reflect that the vehicle has been loaded with more timber. Likewise, at block 1002, the second intermediate point is used for the starting location and the third intermediate point is used for the destination location. Again, then, the process is performed moving through the blocks of the flowchart and, again, after block 918, at block 1001, for this example, it is assumed the answer is again that the trip has not ended. However, because timber has been partially unloaded, again, at block 907, the vehicle weight is suitably adjusted. Now, at block 1002, the starting location is the third intermediate point and the destination location is now the end point for the trip. Thus, after repeating the process, now at 1001, the end of the trip has ultimately been reached.

Now, all the results may be compiled and combined to determine the one or more preferred routes from start point to end point for this trip that includes several stops along the way. That is, in this example, the one or more preferred routes for the respective segments between points of the trip are combined to determine one or more preferred routes for the so-called trip. In at least one implementation, similar to the route shown in FIG. 5, a preferred route may be highlighted on a display that includes a map of the particular landscape with the network of possible routes shown.

By a similar approach, in at least one implementation, a colored map, such as shown in FIG. 4, for example, may also be generated (e.g., by block 922). Of course, as shall be appreciated, as previously mentioned, the intermediate points comprise different harvest landings for different harvest polygon units. In at least one implementation, to generate the map, for the respective harvest landings, over the entire trip, the more energy efficient route (or routes) that includes the harvest landing may be used to color code the particular harvest landing. Consequently, the implementation flowchart of FIG. 10, permits routing and generation of an energy utilization map based at least in part on estimated regenerative energy production for a trip between two points of a network for a particular landscape with mid-trip stops in a manner that accounts for increasing or decreasing load because of the stops between the two points.

Examples of applications of the foregoing routing optimization process described by flowchart for energy routing software computational engine 900 and flowchart of implementation 1000 of the energy routing software computational engine are described presently. In a first application, three EV charging stations are deployed in a forest where logging operations are occurring. The EV charging stations are intended to recharge batteries on ELTs specialized for timber (e.g., log) hauling. In the present example, logging operations are centered in the McDonald-Dunn Research Forest of Oregon State University. The McDonald-Dunn Research Forest is located within the city limits of Corvallis, Oregon. Details have been provided above. In the present example, three charging station nodes have been co-located at disparate nodes within the landscape. This is shown in the landscape map in FIG. 11A, where the locations of the three charging stations nodes are indicated by the five-pointed stars in FIG. 11A. The landscape depicted in FIG. 11A includes harvest unit polygons.

Table 2 below tabulates sample data for ELT and ICE logging truck configurations as would be input at block 801 in FIG. 8. ELTs used configuration number 2 as the unloaded configuration to each destination and 1 was used on the return (loaded) trip. For any mapped diesel results truck configuration number 4 was used on the unloaded trip to each destination and 3 was used on the return (loaded) trip.

TABLE 2

McDonald Dunn unloaded and loaded truck configuration.

| Truck # | Truck Name | Weight (kg) | Tare (kg) | Load (kg) | Pwr Train Eff | Regen Eff | Frontal area (m2) | Engine Eff. |
|---|---|---|---|---|---|---|---|---|
| 1 | Edison R-500 Tandem | 36,287 | 16,287 | 20,000 | 75% | 70% | 7.43 | 80% |
| 2 | Edison R-500 Tandem | 16,287 | 16287 | 0 | 75% | 70% | 4.65 | 80% |
| 3 | Diesel Model 1 | 36,287 | 16,287 | 20,000 | 80% | 0 | 7.43 | 42% |
| 4 | Diesel Model 2 | 16,287 | 16,287 | 0 | 80% | 0 | 4.65 | 42% |

Table 3 below tabulates sample data for road conditions and point data as would be input at block 802 in FIG. 8. Velocities are recorded as speed limits on the different roads. Rolling resistance coefficients are estimates from industry standard tables.

TABLE 3

McDonald Dunn Road Network Data

| Road ID | road class | Surface Type | road name | length (m) | rolling resistance coeff. | velocity (m/s) |
|---|---|---|---|---|---|---|
| 2 | Forest road | rock | 6021.2 | 298 | 0.018 | 11.2 |
| 4 | Forest road | rock | 672 | 532 | 0.018 | 11.2 |
| 1003 | County road | paved | Soap Cr. Rd | 775 | 0.013 | 15.6 |
| 1004 | County road | paved | Coffin Butte Rd | 1239 | 0.013 | 15.6 |
| 20001 | highway | highway | Hwy 20 | 16230 | 0.011 | 24.6 |
| 99001 | highway | highway | Hwy 99W | 7000 | 0.011 | 24.6 |

Table 4 below tabulates sample data for nodes within the road network, as would be input at block 806 in FIG. 8. Elevation values are referenced to sea level.

TABLE 4

McDonald Dunn Node Network Data

| | Road Edge 1 | Road Edge 2 | Road Edge 3 | Road Edge 4 | Elevation (m) |
|---|---|---|---|---|---|
| 0 | 2 | 0 | 0 | 0 | 224 |
| 1 | 2 | 21 | 22 | 0 | 230 |
| 2 | 4 | 0 | 0 | 0 | 230 |
| 3 | 5 | 0 | 0 | 0 | 250 |
| 4 | 6 | 0 | 0 | 0 | 194 |

Results of the computations by engine of energy routing software computational engine 900 are shown graphically in FIG. 11B and in FIG. 11C. The graphical representation of the routing choices within the McDonald Dunn forest landscape are displayed as maps showing polygons related to energy cost in megajoules (MJ) expended by the different vehicles listed in Table 2 travelling to the closest charging station from different polygons along the different types of roads within the landscape, quantified by the sample data in Tables 3 and 4. The graphical results are presented as a polygon map as may be generated by block 922 of FIG. 9 or FIG. 10, and by route output display 213 in FIG. 2B and FIG. 2C.

FIG. 11B depicts a map of monetary expenditure (e.g., in US dollars, USD) in terms of energy cost generated by an e-truck designed for log hauling (e.g., Edison R-500 Tandem) travelling to the nearest charging station from different polygons adjacent to the three charging stations, again indicated by the white stars. The cost polygons are indicated by shades of grey, within the routing system of the McDonald Dunn forest landscape. While the polygons are differentiated by shades of grey, the map may also be colored, and color scale may be indicated in the legend. The scale is graded in intervals of USD 2, starting at 0-2 USD in the darkest shaded polygons. The top of the scale is from 6-8 USD. The results show that the lowest energy expenditure may be realized by e-trucks traveling from high to low elevations, for example in the southern-most portions of the landscape to the mid- and lower charging stations, where regenerative braking would be greatest. The greatest energy expenditure within the landscape occurs at the top, or northern-most portion to the upper charging station. Here, the hilly terrain may have a net zero or slightly positive elevation gain, causing the e-truck motor to consume most or all the energy given back to the battery by regenerative braking on downhill grades.

FIG. 11C depicts a similar map for a conventional diesel logging truck. Overall, energy expenditures show a similar trend as for the e-truck, but costs are greater on average for the diesel truck. As is evident, polygons have darker shading than in FIG. 11B, where some polygons are shaded by the darkest grey shading on the legend. These darkest polygons indicate energy expenditures of 6-8 USD to travel to the nearest charging station from their respective starting nodes. This situation is particularly evident in the northern portion of the landscape. However, it is also true for the middle and southwest corners for travel to the mid- and lower charging stations. The lowest cost region in the south of the landscape in FIG. 11B overlaps largely with the lowest cost region of FIG. 11B for an e-truck. Approximately the same energy expenditure is incurred by both the e-truck and the diesel truck in this polygon. In this region, both types of truck travel mostly downhill from the higher regions. The comparison shows that the e-truck is more economical than a diesel equivalent where the terrain is more uneven, as in the northern and middle regions of the landscape.

In a second application, charging station location selection is made for an urban setting. Here, e-trucks are considered and compared to diesel trucks as in the foregoing forestry example. The urban setting is in Toronto, Ontario, Canada, and considers a hydrovac HVAC (hydroexcavation) service truck fleet run by Ontario Excavac (now OE Utility Services, Ltd, Vaughan, Ontario, or simply "OE"). The exemplary service fleet comprises both e-trucks and diesel-powered trucks. Both types of trucks have similar weight and shape characteristics, the difference being in the power plant. For example, sample vehicle characteristic data are tabulated in Table 5. It may be noted that an e-truck made for HVAC service is not commercially available at the time of filing of this patent application, but data for a hypothetical e-truck for HVAC service are adapted from a current logging e-truck model (e.g., Edison R500).

TABLE 5

| Truck comparison data | | | | | | | | | |
|---|---|---|---|---|---|---|---|---|---|
| Truck # | Name | Weight (kg) | Tare (kg) | Load (kg) | Pwr Train + Engine Eff | Frontal Area (m2) | Engine Eff | Regen eff | Pwr Train eff |
| 1 | E-truck HVAC | 31,287 | 16,287 | 15,000 | 60% | 7.43 | 80% | 70% | 75% |
| 2 | Diesel HVAC | 26,287 | 16,287 | 10,000 | 36% | 7.0 | 45% | 0 | 80% |

Table 6 below tabulates sample road data for the city of the Toronto urban network. The region is 7125 km2 in area, and has thousands of km of roads, split into millions of lines. The road lines were furnished by the government of Canada census data and were trimmed to remove residential streets and locations not serviced by OE. Dispatch operators and drivers of a fleet of HVAC e-trucks operated by OE, for example, may utilize these data for determination of closest charging and service stations.

TABLE 6

| OE Road Network | | | | | |
|---|---|---|---|---|---|
| Road ID | Road Class | Surface type | Length (m) | Rolling resistance | Velocity (m/s) |
| 46 | Highway | Highway | 2895 | 0.011 | 25 |
| 47 | Highway | Highway | 7074 | 0.011 | 25 |
| 48 | Highway | Highway | 4575 | 0.011 | 25 |
| 49 | Highway | Highway | 20,137 | 0.011 | 25 |
| 50 | Gas Pipeline | Service | 27,293 | 0.018 | 11.2 |
| 51 | Gas Pipeline | Service | 122,365 | 0.018 | 11.2 |
| 52 | Gas Pipeline | Service | 13,106 | 0.018 | 11.2 |
| 53 | Gas Pipeline | Service | 37,773 | 0.018 | 11.2 |
| 54 | Gas Pipeline | Service | 9360 | 0.018 | 11.2 |
| 67 | Oil Pipeline | Service | 13,502 | 0.018 | 11.2 |
| 68 | Oil Pipeline | Service | 8504 | 0.018 | 11.2 |
| 69 | Oil Pipeline | Service | 8805 | 0.018 | 11.2 |

TABLE 6-continued

| OE Road Network | | | | | |
|---|---|---|---|---|---|
| Road ID | Road Class | Surface type | Length (m) | Rolling resistance | Velocity (m/s) |
| 70 | Oil Pipeline | Service | 118,260 | 0.018 | 11.2 |
| 71 | Oil Pipeline | Service | 8860 | 0.018 | 11.2 |
| 72 | Major road | Paved | 18,716 | 0.013 | 19.4 |
| 73 | Highway | Highway | 16,135 | 0.011 | 25 |
| 74 | Highway | Highway | 5568 | 0.011 | 25 |

TABLE 7

| OE Node network data | | | | | | |
|---|---|---|---|---|---|---|
| Node ID | Road edge 1 | Road edge 2 | Road edge 3 | Road edge 4 | Elevation (m) | Point class |
| 1 | 28 | 33 | 112 | 0 | 108 | intersection |
| 2 | 26 | 27 | 178 | 493 | 119 | intersection |
| 3 | 22 | 27 | 170 | 0 | 147 | intersection |
| 4 | 18 | 19 | 23 | 248 | 181 | intersection |
| 5 | 13 | 14 | 172 | 0 | 128 | intersection |
| 6 | 177 | 0 | 0 | 0 | 115 | intersection |
| 7 | 18 | 175 | 492 | 496 | 157 | intersection |
| 8 | 17 | 65 | 0 | 0 | 173 | intersection |
| 9 | 11 | 16 | 18 | 17 | 167 | intersection |

TABLE 7-continued

| OE Node network data | | | | | | |
|---|---|---|---|---|---|---|
| Node ID | Road edge 1 | Road edge 2 | Road edge 3 | Road edge 4 | Elevation (m) | Point class |
| 10 | 10 | 12 | 174 | 0 | 164 | intersection |
| 11 | 21 | 365 | 0 | 0 | 177 | intersection |
| 12 | 20 | 340 | 359 | 0 | 181 | intersection |
| 13 | 19 | 20 | 46 | 133 | 203 | intersection |

Figure 12A:
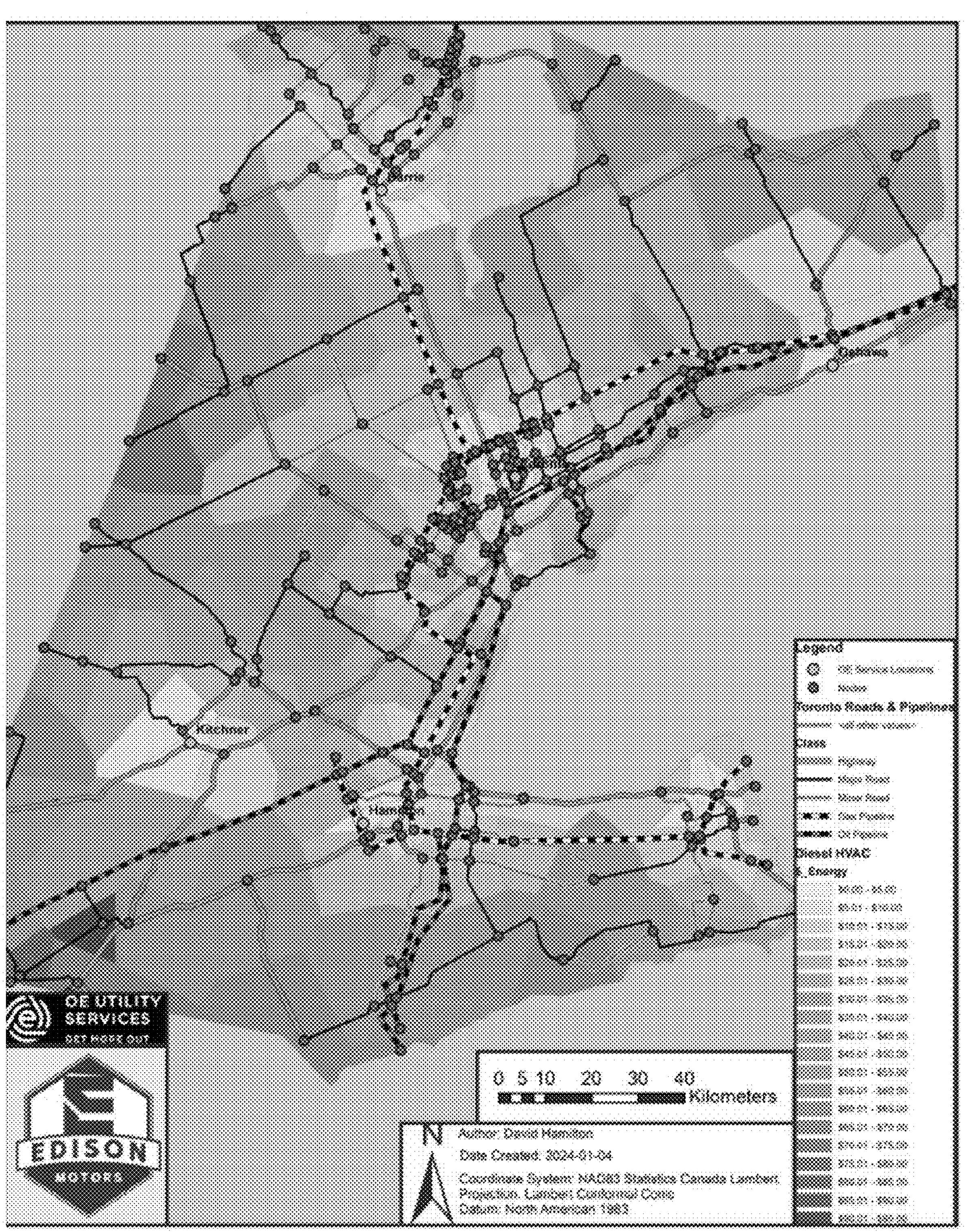
FIG. 12A. illustrates a color-coded map generated by the energy routing software computational engine shown in FIG. 9, in which colors across an urban landscape depict estimated energy monetary cost for an e-truck travelling to the nearest charging station, in accordance with at least one example.
Figure 12B:
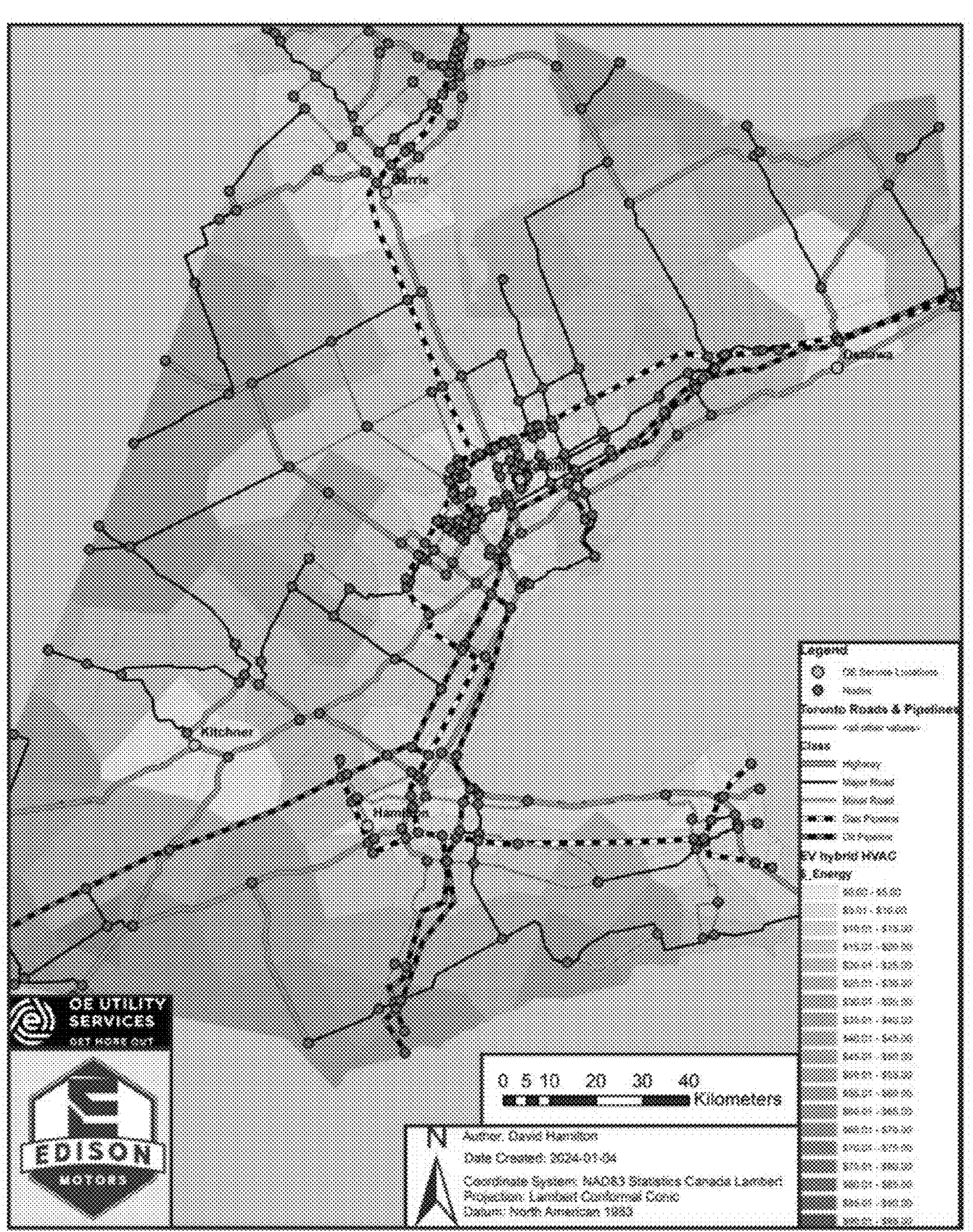
FIG. 12B illustrates a color-coded map generated by the energy routing software computational engine shown in FIG. 9, in which colors across an urban landscape depict estimated energy monetary cost for a diesel truck travelling to the nearest fueling station, in accordance with at least one example.

Based on the sample data presented in Tables 5, 6, and 7, results of the computations by energy routing software computational engine 900 are shown graphically in FIG. 12A and in FIG. 12B. The landscape is confined to the city limits of Toronto. Sample service locations are depicted in FIGS. 12A and 12B by the five-pointed stars located at the Barrie, Kitchner, Toronto, Hamilton, and Oshawa locations. The locations for the service stations are preselected prior to the calculations. For example, node and service station locations may be input by a user or automatically at block 806.

FIG. 12A shows the energy costs in Canadian dollars ($) calculated by the energy routing software engine of FIG. 9 based on the data inputs shown in Tables 5, 6 and 7. The monetary energy expenditures for an e-truck based on data from table 5, for example, are displayed in FIG. 12A for travel from any node or other location within the mapped landscape to an indicated service station. The legend of the map output (e.g., from block 922) indicates that the costs increase from the lightest grey shading to the darkest. For example, the lightest grey shade indicates a cost between $0 to $5, where the costs increase in increments of $5. Nodes, as indicated by the grey dots, may be businesses or other infrastructure facilities, such as municipal water and gas distribution facilities, serviced by OE. It may be noted from FIG. 12A that nodes are clustered, and service station locations are positioned within or near the node clusters. It may be concluded from the analysis performed by energy routing software computational engine 900 of the energy routing software computational engine and displayed in FIG. 12A, that locating service stations within a 10 to 20 km radius of a cluster of nodes is, within good estimation, the most economical manner to operate the HVAC e-fleet. A charging station may be available at each of the service stations indicated at the starred locations.

A side-by-side comparison with e-truck data may be made for a fleet of diesel HVAC trucks, as revealed by the identical urban landscape mapped in FIG. 12B. It may be observed that within node clusters, almost identical energy expenditures may be incurred by a diesel-powered truck compared to a comparable e-truck, as quantified in Table 5. However, outside of the node clusters, in general the diesel fleet may be more expensive to operate than the e-fleet. The decision to purchase e-trucks to replace some or all diesel trucks within the fleet may be carefully weighed by detailed study of the energy cost data. For example, Tables 8 and 9 compare average monetary expenditures computed by energy routing software computational engine 900 shown in FIG. 9. The output may be based on the above inputs (e.g., Tables 5, 6 and 7) for e-HVAC trucks and diesel HVAC trucks. These averages may facilitate fleet purchase, as well as service center location decision making, and route planning.

TABLE 8

OE routing results

| Truck | T (min) | KWH | kJ/km | KWH/day | Distance (km) | Fuel cost ($) | Total cost ($) | MWH/day |
|---|---|---|---|---|---|---|---|---|
| EV | 45 | 124 | 9282 | 992.6 | 46.7 | 13.67 | 162.22 | 0.99 |
| diesel | 45 | 176 | 13,438 | 1406 | 45.7 | 19.37 | 168.35 | 1.41 |

TABLE 9

OE routing averages comparison

| parameter | e-truck | diesel | % difference |
|---|---|---|---|
| Distance (km) | 46.7 | 45.7 | −2% |
| Time (min) | 45.17 | 45.43 | 1% |
| Cost (MJ) | 446.65 | 632.81 | 29% |
| Cost ($ energy) | 13.67 | 19.37 | 29% |
| Cost ($ man-hr) | 125.28 | 125.71 | 0% |

In at least one implementation, the energy routing software engine shown in FIG. 9 is also configured to output distance to nearest station within a district or region and energy expenditure (in megajoules, for example), as well as other data.

Referring now to FIG. 2A, in an implementation, first computing device 202 ("first device" in the figure) and third computing device 206 ("third device" in the figure) may be capable of rendering a graphical user interface (GUI) for a network device and/or a computing device, for example, so that a user-operator may engage in system use. Computing device 204 ("second device" in the figure) may potentially serve a similar function in this illustration. Likewise, in FIG. 2A, first computing device 202 ('first device' in figure) may interface with computing device 204 ('second device' in figure), which may, for example, comprise features of a client computing device and/or a server computing device, in an implementation.

Processor 220 (e.g., processing device) and memory 222, which may comprise primary memory 224 and secondary memory 226, may communicate by way of a communication bus 201, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. It is further noted that the term "computing device," in general, whether employed as a client and/or as a server, or otherwise, refers at least to a processor and a memory connected by a communication bus, such as illustrated in FIG. 2A. Thus, a computing device, in the context of the present patent application, may comprise hardware, software, firmware, or any combinations thereof (other than software per se). Computing device 204, as depicted in FIG. 2A is merely one example, and claimed subject matter is not necessarily limited in scope to this particular example.

In at least one implementation, a device, such as a computing device and/or networking device, may comprise, for example, any of a wide range of digital electronic devices. These may include, but are not limited to, desktop and/or laptop computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combinations of the foregoing. These may also include, but are not otherwise limited to, current and/or next generation stand-alone virtual reality (VR), augmented reality (AR), mixed reality (MR), and/or extended reality (XR) devices, or any combinations of the foregoing. Likewise, the terms computing device, computer, computer device, computer system, computer platform and the like may be used interchangeable through this document without loss of generality or understanding. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a web-enabled computing device may include a physical and/or a virtual keyboard, mass storage, one or more accelerometers, one or more gyroscopes, global positioning system (GPS) and/or other location-identifying type capability, and/or a display with a high degree of functionality, such as a touch-sensitive color 2D or 3D display.

Communications between a computing device and/or a network device and a wireless network, as an example, may be in accordance with known and/or to be developed network protocols including, but not limited to, for example, global system for mobile communications (GSM), enhanced data rate for GSM evolution (EDGE), 802.11b/g/n/h, etc., worldwide interoperability for microwave access (WiMAX), 3G, 4G, 4G, 5G, as well as any or all next generation wireless network protocols, or any combinations thereof. A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that it may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other implementations, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as IOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

Additional details regarding the components of computing device 204 were either described previously or are described later. However, it is noted that, in an implementation, computing device 204 may comprise a computing device or system that includes a state-of-the art graphics processor unit (GPU) and a state-of-the-art central processing unit (CPU), such as the Nvidia RTX3070 GPU, available from Nvidia Corp., and the Intel Core i9 microprocessor, available from Intel Corp., both located in San Jose, CA, as merely examples. It is noted, of course, that claimed subject matter is not limited in scope in this respect. Nonetheless, such an implementation, for example, may include software capable of computer generating a three-dimensional energy utilization map. For example, in an implementation, such a map may otherwise be like the maps previously discussed, but viewable in a three-dimensionally rendered environment, such as a three-dimensional gaming environment, as an example. Likewise, as indicated, claimed subject matter is not limited in scope in this respect.

In this context, the term "three-dimensional (3D) gaming environment" refers to a computer-generated three-dimensional virtual representation to at least in part depict a real-world environment, which may, as an example, be generated from geometric signal and/or state information, with the ability for a user to virtually move within and/or virtually interact with that three-dimensional virtual representation, if desired. For example, as user may desire to highlight a particular route shown on a landscape, for example. Furthermore, a 3D gaming environment, in an implementation, may be fully immersive and photorealistic, as described in more detail below.

As another example of an implementation, computing device 204 may comprise a server or even several servers, such as may be provided by Amazon Web Services (AWS), see https://aws.amazon.com/, or by Microsoft Azure, see https://azure.microsoft.com/en-us/get-started/azure-portal. For example, such one or more servers may include software executable to provide a "virtual machine," denoted VM, so that it is not necessary to own a computing device or system to have the capability to computer generate a 3D gaming environment for others to access. That is, for such an implementation, computing device 204, for example, may be accessible via a network, such as via the Internet or the Worldwide Web. Again, claimed subject matter is not intended to be limited in scope to this illustrative example.

Thus, in an implementation, a computing device 204 may execute 3D rendering software and/or other similar software tools to computer generate a three-dimensional gaming environment to render an energy utilization map like the maps previously discussed capable of being accessible via a computing and/or communications network, such as the Internet or Worldwide Web. A host of commercial application software is available in this regard.

Likewise, a host of three-dimensional models are available or may be created that are able to be rendered on a computing device, such 204. Thus, a three-dimensional model for a map of energy utilization may be purchased or easily developed. Unreal Engine 5.1 is an example of software to computer generate a 3D model. Of course, claimed subject matter is not intended to be limited to any particular 3D model.

For one implementation, virtual navigation, such as to highlight a route, or for another purpose, might be accomplished with a mouse, for example, in which moving the mouse may result in virtual movement within the 3D gaming environment. Likewise, a mouse, again, merely as an example, may permit zooming in and/or zooming out, perhaps via scrolling, for example. Again, these are merely illustrative examples.

Thus, once or after the 3D model is edited and complete, it may be rendered by executing Unreal Engine 5.1, for example. Once or after being rendered, a user, sometimes described as a first person in a game, as suggested above, in a "play" virtual navigation mode, would be able to virtually navigate within the 3D gaming environment to move among and/or between different potential vehicle routes. Again, in one particular virtual navigation mode, for example, this may be done via a mouse and/or similar input device. Likewise, in a "play" virtual navigation mode, it may be possible for multiple individuals to "play" at the same time, which may even be done using networking technology, as alluded to previously and described in more detail later, so individuals may "play" from separate physical locations to result in potential collaboration regarding route decision making, in an example implementation.

For the purposes of this patent application, a "virtual reality simulation device" refers to any device or set of devices able to render and, therefore, display a three-dimensional gaming environment. Thus, typically, a computing device and/or computing system, with a suitable manner of displaying visual content in three-dimensions, comprises an example of a virtual reality simulation device. However, it may include many other devices, as well, including, as examples, but without limitation, tablets, smart phones, laptops, high resolution 2D computer displays, mobile smartphones, HDTV, video projectors, current and/or next generation virtual reality (VR), augmented reality (AR), mixed reality (MR), and/or "xtended" reality (XR) googles and/or glasses, or any combinations of the foregoing. For example, in many instances, a display device, such as a high resolution 2D computer display or virtual reality glasses or goggles, may be able to connect or couple to a computing device, for example, such as via a wired or wireless connection, to result in a "virtual reality simulation device."

Continuing with discussion of the present implementation, 3D virtual displays are able to be populated via execution by Unreal Engine of a "blueprint script." The blueprint visual scripting system, for example, in Unreal Engine is a complete gameplay scripting system based on the concept of using a node-based interface to create gameplay elements from within the Unreal Editor.

In terms of a 3D gaming environment, a user may be viewed as a player, often termed a "first person." This refers to the user who then may be navigating within a 3D virtual display and be interacting with the 3D virtual display to affect the content shown or displayed. Consequently, within a 3D gaming environment, a 3D virtual display may be arranged in a particular configuration may be populated to form a template for the display of and/or interaction with 3D content, such as a displayed energy utilization map, as previously discussed. It is noted, for an implementation using Unreal Engine, as an example, a "blueprint script" of the blueprint scripting system, for example, may be employed to form such templates, perhaps with a particular 3D model, depending on the particular template.

Previously, a few approaches to virtual navigating within the gaming environment between and/or among 3D virtual displays were mentioned. However, claimed subject matter is not limited in scope to those examples. Other modes and/or ways to navigate are intended to be included within the scope of claimed subject matter. It is noted, as previously discussed, for an implementation using Unreal Engine, as an example, using a "blueprint script" of the blueprint visual scripting system, for example, various navigation modes, such as these examples, may be implemented. Perhaps, continuing, via at least one of: mouse clicks, keyboard touch events, screen touch events, remote control actuation events, speaking events, or any combinations thereof, other ways of virtual navigation within the gaming environment may be realized.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a way a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion but are not intended to necessarily restrict scope of claimed subject matter. For example, the term "over," as an example, is not meant to suggest that claim scope is limited to only situations in which an implementation is right side up, such as in comparison with the implementation being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular and/or the plural, "and/or" is also used to describe a plurality and/or some other combination of features, structures, characteristics, and/or the like. Likewise, the terms "based", "based on" and/or similar terms are understood as not necessarily intending to convey an exhaustive list of factors, but to allow for existence of additional factors not necessarily expressly described.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter and/or patent eligibility. Rather, it is asserted, that physical measurements are not mental steps and, likewise, are not abstract ideas. Thus, it is understood, of course, that a distribution of scalar numerical values, for example, without loss of generality, substantially in accordance with the foregoing description and/or later description, is related to physical measurements, and is likewise understood to exist as physical signals and/or physical signal samples.

The terms "correspond", "reference", "associate", and/or similar terms relate to signals, signal samples and/or states, e.g., components of a signal measurement vector, which may be stored in memory and/or employed with operations to generate results, depending, at least in part, on the above-mentioned, signal samples and/or signal sample states. For example, a signal sample measurement vector may be stored in a memory location and further referenced wherein such a reference may be embodied and/or described as a stored relationship. A stored relationship may be employed by associating (e.g., relating) one or more memory addresses to one or more other memory addresses, for example, and may facilitate an operation, involving, at least in part, a combination of signal samples and/or states stored in memory, such as for processing by a processor and/or similar device, for example. Thus, in a particular context, "associating," "referencing," and/or "corresponding" may, for example, refer to an executable process of accessing memory contents of two or more memory locations, e.g., to facilitate execution of one or more operations among signal samples and/or states, wherein one or more results of the one or more operations may likewise be employed for additional processing, such as in other operations, or may be stored in the same or other memory locations, as may, for example, be directed by executable instructions. Furthermore, terms "fetching" and "reading" or "storing" and "writing" are to be understood as interchangeable terms for the respective operations, e.g., a result may be fetched (or read) from a memory location; likewise, a result may be stored in (or written to) a memory location.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various implementations. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combinations thereof. As mentioned, signal packets and/or frames, for example, may be exchanged, such as between a server device and/or a client device, as well as other types of devices, including between wired and/or wireless devices coupled via a wired and/or wireless network, for example, or any combinations thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

For ease of description, a network device (also referred to as a networking device) may be embodied and/or described in terms of a computing device and vice versa. However, it should further be understood that this description should in no way be construed so that claimed subject matter is limited to one implementation, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combinations thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, a portion of the Internet. Thus, for example, a network "in the cloud," such as a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an implementation at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an implementation, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The terms electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an implementation.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an implementation. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter is not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example implementation. As alluded to above, in one or more implementations, a Web page may comprise digital content coded (e.g., via computer instructions) using one or more languages, such as, for example, markup languages, including HTML and/or XML, although claimed subject matter is not limited in scope in this respect. Also, in one or more implementations, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content," "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more implementations, an electronic document and/or an electronic file may comprise a Web page of code (e.g., computer instructions) in a markup language executed or to be executed by a computing and/or networking device, for example. In another implementation, an electronic document and/or electronic file may comprise a portion and/or a region of a Web page. However, claimed subject matter is not intended to be limited in these respects.

Also, for one or more implementations, an electronic document and/or electronic file may comprise a number of components. As previously indicated, in the context of the present patent application, a component is physical, but is not necessarily tangible. As an example, components with reference to an electronic document and/or electronic file, in one or more implementations, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more implementations, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an implementation, digital content may comprise, for example, text, images, audio, video, and/or other types of electronic documents and/or electronic files, including portions thereof, for example.

Also, in the context of the present patent application, the terms attributes (e.g., one or more attributes) and/or parameters (e.g., one or more parameters) refer to material descriptive of a collection of signal samples, such as one or more electronic documents and/or electronic files, and exist in the form of physical signals and/or physical states, such as memory states. For example, one or more parameters and/or attributes, such as referring to an electronic document and/or an electronic file comprising an image, may include, as examples, time of day at which an image was captured, latitude and longitude of an image capture device, such as a camera, for example, etc. In another example, one or more parameters and/or attributes relevant to digital content, such as digital content comprising a technical article, as an example, may include one or more authors, for example. Claimed subject matter is intended to embrace meaningful, descriptive attributes and/or parameters in any format, so long as the one or more parameters and/or attributes comprise physical signals and/or states, which may include, as examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between physical nodes of a physical network, where a physical node may comprise one or more network devices and/or one or more computing devices, for example. As an illustrative example, but without limitation, a physical node may comprise one or more sites employing a local network address, such as in a local network address space. Likewise, a device, such as a network device and/or a computing device, may be associated with that physical node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via a physical access node coupled to the Internet or vice-versa. Likewise, a signal packet and/or frame may be forwarded via physical network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven-layer type of approach and/or description. A network computing and/or communications protocol (also referred to as a network protocol) refers to a set of signaling conventions, such as for communication transmissions, for example, as may take place between and/or among devices in a physical network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an implementation, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, PCI and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPV6, and/or other later to be developed versions.

Regarding aspects related to a network, including a communication and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, $4^{th}$ and/or 5th generation (2G, 3G, 4G, and/or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

In one example implementation, as shown in FIG. 2A, a system implementation may comprise a local network (e.g., computing device 204 and device-readable medium 240) and/or another type of network, such as a computing and/or communications network. For purposes of illustration, therefore, FIG. 2A shows an implementation of computing system 200 that may be employed to implement either type or both types of networks. Network 208 may comprise one or more network connections, links, processes, services, applications, and/or resources to facilitate and/or support communications, such as an exchange of communication signals, for example, between a computing device, such as 202, and another computing device, such as device 206, which may, for example, comprise one or more client computing devices and/or one or more server computing device. By way of example, but not limitation, network 208 may comprise wireless and/or wired communication links, telephone and/or telecommunications systems, Wi-Fi networks, Wi-MAX networks, the Internet, a local area network (LAN), a wide area network (WAN), or any combinations thereof. It will be appreciated and noted again that the computing systems comprising self-contained network 250 and cloud-based network 260 shown in FIGS. 2B and 2C, respectively, are additional implementations of computing system 200, and may be regarded as exemplary implementations of computing system 200.

As mentioned, example devices in FIG. 2A, and subsequently in FIGS. 2B and 2C, may comprise features, for example, of a client computing device and/or a server computing device, in an implementation. It is further noted that the term computing device, in general, whether employed as a client and/or as a server, or otherwise, refers at least to a processor and a memory connected by a communication bus. A "processor," for example, is understood to connote a specific structure such as a central processing unit (CPU) of a computing device which may include a control unit and an execution unit. In an aspect, a processor may comprise a device that interprets and executes instructions to process input signals to provide output signals. As such, in the context of the present patent application at least, computing device and/or processor are understood to refer to sufficient structure within the meaning of 35 USC § 112(f) so that it is specifically intended that 35 USC § 112(f) not be implicated by use of the term "computing device," "processor" and/or similar terms; however, if it is determined, for some reason not immediately apparent, that the foregoing understanding cannot stand and that 35 USC § 112(f), therefore, necessarily is implicated by the use of the term "computing device," "processor" and/or any other terms, then, it is intended, pursuant to that statutory section, that corresponding structure, material and/or acts for performing one or more functions be understood and be interpreted to be described at least in FIG. 2A and in the text associated with FIG. 2A of the present patent application.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 2A, processor 220 may comprise one or more circuits, such as digital circuits, to perform at least a portion of a computing procedure and/or process. By way of example, but not limitation, processor 220 may comprise one or more processors, such as controllers, microprocessors, microcontrollers, application specific integrated circuits, digital signal processors, programmable logic devices, field programmable gate arrays, the like, or any combinations thereof. In various implementations, processor 220 may perform signal processing, typically substantially in accordance with fetched executable computer instructions, such as to manipulate signals and/or states, to construct signals and/or states, etc., with signals and/or states generated in such a manner to be communicated and/or stored in memory, for example.

Memory 222 may store electronic files and/or electronic documents, such as relating to one or more users, and may also comprise a computer-readable medium that may carry and/or make accessible content, including code and/or instructions, for example, executable by processor 220 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an implementation.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, attributes, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining," "establishing," "obtaining," "identifying," "selecting," "generating," and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general-purpose computing and/or network device, such as a general-purpose computer, once it is programmed to perform particular functions, such as pursuant to program software instructions.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The following are additional examples provided in view of the above-described implementations. Here, one or more features of example, in isolation or in combination, can be combined with one or more features of one or more other examples to form further examples also falling within the scope of the disclosure. As such, one implementation can be combined with one or more other implementations without changing the scope of disclosure.

Example 1 is a method comprising executing a plurality of instructions by one or more processors coupled to one or more memories in which executable instructions are stored on at least one of the one or more memories, wherein executing the plurality of instructions result in selecting a start point and an end point for a vehicle within a route network estimating an energy utilization for one or more routes within the route network for the vehicle from the start point to one or more respective intermediate points within the route network and from the one or more respective intermediate points to the end point and/or from the end point to the one or more respective intermediate points and from the one or more respective intermediate points to the start point, based at least partially on an estimated regenerative energy production along the one or more routes by the vehicle; and selecting at least one preferred route from the route network based at least partially on the energy utilization.

Example 2 is a method as in any of the examples, particularly example 1, wherein executing the plurality of instructions further result in generating a coded energy utilization map for the route network across a landscape comprising the route network based at least partially on the estimated regenerative energy production along the one or more routes of the route network by the vehicle.

Example 3 is a method as in any of the examples, particularly example 2, wherein estimating the energy utilization is performed for the vehicle along the one or more routes of the route network with the vehicle being unloaded, partially loaded with one or more partial loads, and/or fully loaded.

Example 4 is a method as in any of the example, particularly example 2, wherein coding for the coded energy utilization map comprises color coding.

Example 5 is a method as in any of the examples, particularly example 4, wherein estimating the energy utilization, comprises: inputting a plurality of nodes, a plurality of road segments, and a plurality of destination polygons corresponding to the landscape from at least one shapefile; selecting a set of road and point data for the route network; calculating edge weights based on the plurality of nodes, road lines and destination polygons; selecting a set of charging station locations to be located within the landscape; generating a multidirectional network of the one or more routes within the route network for at least for one vehicle travelling in two directions between the start point and the end point, wherein the one or more routes respectively comprise a series of respective interconnected road segments between the plurality of nodes; performing, for the respective interconnected road segments forming the one or more routes within the multidirectional network, an edge weight calculation producing edge weight estimates for the respective interconnected road segments, for the vehicle, based at least partially on a set of factors at least including: the estimated regenerative energy production along the respective interconnected road segments by the vehicle; an estimated distance traveled along the respective interconnected road segments by the vehicle; an estimated slope along the respective interconnected road segments; an estimated rolling resistance vehicle configuration along the respective interconnected road segments; and an estimated frontal area of the vehicle along the respective interconnected road segments; and determining, via the edge weight estimates for the respective interconnected road segments, a lowest cost and/or one or more lower cost routes at least in terms of estimated energy utilization based at least partially on regenerative energy production to and from the start point and the end point via one or more intermediate points within the route network.

Example 6 is a method as in any of the examples, particularly example 5, wherein determining the lowest cost and/or the one or more lower cost routes comprises determining the lowest cost and/or the one or more lower cost routes based at least partially on one or more additional factors including at least one of: estimated total travel time, estimated total travel distance, battery capacity, locations of charging stations, estimated cost of human labor, real-time weather reporting, real-time traffic reporting, or any combination thereof.

Example 7 is a method as in any of the examples, particularly example 5, wherein determining the lowest cost and/or the one or more lower cost routes comprises computing a shortest path between the start point and the end point, wherein computing the shortest path is performed by a Bellman-Ford algorithm.

Example 8 is a method as in any of the examples, particularly example 5, wherein executing the plurality of instructions further results in tracking in real-time, via the coded energy utilization map, movement of the vehicle along the at least one preferred route.

Example 9 is a method as in any of the examples, particularly example 8, wherein tracking in real-time the movement of the vehicle along the at least one preferred route comprises tracking in real-time movement of a fleet of vehicles in which the movement of the fleet of vehicles is along preferred routes for the vehicles of the fleet.

Example 10 is a method as in any of the examples, particularly example 1, wherein the vehicle comprises at least one electric vehicle.

Example 11 is a method as in any of the examples, particularly example 1, wherein executing the plurality of instructions further results in highlighting, on a generated map of the route network, the at least one preferred route to be travelled by the vehicle between the start point and the end point.

Example 12 is an article comprising: a non-transitory storage medium including executable instructions stored thereon, wherein executing the executable instructions results in: routing of a vehicle using one or more multidirectional network graphs with one or more negative edge weights to estimate an energy utilization based at least partially on an estimated regenerative breaking along one or more segments of the one or more multidirectional network graphs, wherein the routing comprises using an estimated energy loss and/or estimated energy generation as a negative edge weight of the one or more negative edge weights, wherein the one or more multidirectional network graphs represent a landscape, and wherein the routing of the vehicle using the one or more multidirectional network graphs with the one or more negative edge weights to estimate a first energy utilization based at least partially on a regenerative energy production facilitates generation of a coded map depicting an estimated energy utilization by the vehicle across the landscape; selecting a start point and an end point for the vehicle within a route network; estimating a second energy utilization for one or more routes of the route network for the vehicle from the start point to one or more respective intermediate points within the one or more multidirectional network graphs and from the one or more respective intermediate points to the end point and/or from the end point to the one or more respective intermediate points and from the one or more respective intermediate points to the start point, based at least partially on an estimated regenerative energy production along the route network travelled by the vehicle; selecting at least one preferred route based at least partially on the estimated energy utilization; and generating a coded energy utilization map.

Example 13 is an article as in any of the examples, particularly example 12, wherein the vehicle comprises at least one electric vehicle.

Example 14 is an article as in any of the examples, particularly example 12, wherein coding for the coded energy utilization map comprises color coding.

Example 15 a computing device comprising one or more processors coupled to one or more memories, wherein the one or more memories include executable instructions stored thereon, wherein executing the executable instructions result in: selecting a start point and an end point for a vehicle within a route network; estimating an energy utilization, for one or more routes of the route network for the vehicle from the start point to one or more respective intermediate points within the route network and from the one or more respective intermediate points to the end point and/or from the end point to the one or more respective intermediate points and from the one or more respective intermediate points to the start point, based at least partially on an estimated regenerative energy production along the one or more routes traveled by the vehicle; and routing of the vehicle using one or more multidirectional network graphs with negative edge weights to estimate the energy utilization based at least partially on an estimated regenerative breaking along one or more segments of the one or more multidirectional network graphs, wherein the routing comprises using an estimated energy loss and/or estimated energy generation as an edge weight, wherein the one or more multidirectional network graphs represent a landscape, and wherein the routing of the vehicle using the one or more multidirectional network graphs with the negative edge weights to estimate the energy utilization based at least partially on a regenerative energy production facilitates generation of a coded map depicting estimated energy utilization by the vehicle across the landscape.

Example 16 is a computing device as in any of the examples, particularly example 15, wherein the one or more processors are coupled to an on-board computing system, and wherein the on-board computing system is a self-contained computing system or a cloud-based computing system.

Example 17 is a computing device as in any of the examples, particularly example 16, wherein the on-board computing system comprises an input and an output, wherein the input comprises a manual input or a software input, and wherein the output comprises a map display and a data display.

Example 18 is a computing device as in any of the examples, particularly example 17, wherein a global positioning system (GPS) module is coupled to the on-board computing system.

Example 19 is a computing device as in any of the examples, particularly example 16, wherein the on-board computing system is contained within a portable computer.

Example 20 is a computing device as in any of the examples, particularly example 19, is a computing device as in any of the examples, particularly example 16, wherein the on-board computing system is contained within a portable computer.

What is claimed is:

1. A method comprising:

executing a plurality of instructions by one or more processors coupled to one or more memories in which executable instructions are stored on at least one of the one or more memories, wherein executing the plurality of instructions result in:

selecting a start point and an end point for a vehicle within a route network;

estimating an energy utilization for one or more routes within the route network for the vehicle from the start point to one or more respective intermediate points within the route network and from the one or more respective intermediate points to the end point and/or from the end point to the one or more respective intermediate points and from the one or more respective intermediate points to the start point, based at least partially on an estimated regenerative energy production along the one or more routes by the vehicle;

selecting at least one preferred route from the route network based at least partially on the energy utilization; and routing the vehicle along the at least one preferred route using one or more multidirectional network graphs with negative edge weights to estimate the energy utilization based at least partially on an estimated regenerative braking along one or more segments of the one or more multidirectional network graphs, wherein the routing comprises using an estimated energy loss and/or estimated energy generation as a negative edge weight of the negative edge weights; and computing a shortest path between the start point and the end point using a Bellman-Ford algorithm, wherein the Bellman-Ford algorithm handles the negative edge weights.

2. The method of claim 1, wherein executing the plurality of instructions further result in generating a coded energy utilization map for the route network across a landscape comprising the route network based at least partially on the estimated regenerative energy production along the one or more routes of the route network by the vehicle.

3. The method of claim 2, wherein estimating the energy utilization is performed for the vehicle along the one or more routes of the route network with the vehicle being unloaded, partially loaded with one or more partial loads, and/or fully loaded.

4. The method of claim 2, wherein coding for the coded energy utilization map comprises color coding.

5. The method of claim 4, wherein estimating the energy utilization, comprises:

inputting a plurality of nodes, a plurality of road segments, and a plurality of destination polygons corresponding to the landscape from at least one shapefile;

selecting a set of road and point data for the route network;

calculating edge weights based on the plurality of nodes, road lines and destination polygons;

selecting a set of charging station locations to be located within the landscape;

generating a multidirectional network of the one or more routes within the route network for at least one vehicle travelling in two directions between the start point and the end point, wherein the one or more routes respectively comprise a series of respective interconnected road segments between the plurality of nodes;

performing, for the respective interconnected road segments forming the one or more routes within the multidirectional network, an edge weight calculation producing edge weight estimates for the respective interconnected road segments, for the vehicle, based at least partially on a set of factors including at least:

the estimated regenerative energy production along the respective interconnected road segments by the vehicle;

an estimated distance traveled along the respective interconnected road segments by the vehicle;

an estimated slope along the respective interconnected road segments;

an estimated rolling resistance vehicle configuration along the respective interconnected road segments; and an estimated frontal area of the vehicle along the respective interconnected road segments; and determining, via the edge weight estimates for the respective interconnected road segments, a lowest cost and/or one or more lower cost routes at least in terms of estimated energy utilization based at least partially on regenerative energy production to and from the start point and the end point via one or more intermediate points within the route network.

6. The method of claim 5, wherein determining the lowest cost and/or the one or more lower cost routes comprises determining the lowest cost and/or the one or more lower cost routes based at least partially on one or more additional factors including at least one of: estimated total travel time, estimated total travel distance, battery capacity, locations of charging stations, estimated cost of human labor, real-time weather reporting, real-time traffic reporting, or any combination thereof.

7. The method of claim 5, wherein executing the plurality of instructions further results in tracking in real-time, via the coded energy utilization map, movement of the vehicle along the at least one preferred route.

8. The method of claim 7, wherein tracking in real-time the movement of the vehicle along the at least one preferred route comprises tracking in real-time movement of a fleet of vehicles in which the movement of the fleet of vehicles is along preferred routes for the vehicles of the fleet.

9. The method of claim 1, wherein the vehicle comprises at least one electric vehicle.

10. The method of claim 1, wherein executing the plurality of instructions further results in highlighting, on a generated map of the route network, the at least one preferred route to be travelled by the vehicle between the start point and the end point.

11. An article comprising: a non-transitory storage medium including executable instructions stored thereon, wherein executing the executable instructions results in:

routing of a vehicle using one or more multidirectional network graphs with one or more negative edge weights to estimate an energy utilization based at least partially on an estimated regenerative breaking along one or more segments of the one or more multidirectional network graphs, wherein the routing comprises using an estimated energy loss and/or estimated energy generation as a negative edge weight of the one or more negative edge weights, wherein the one or more multidirectional network graphs represent a landscape, and wherein the routing of the vehicle using the one or more multidirectional network graphs with the one or more negative edge weights to estimate a first energy utilization based at least partially on a regenerative energy production facilitates generation of a coded map depicting an estimated energy utilization by the vehicle across the landscape;

selecting a start point and an end point for the vehicle within a route network;

estimating a second energy utilization for one or more routes of the route network for the vehicle from the start point to one or more respective intermediate points within the one or more multidirectional network graphs and from the one or more respective intermediate points to the end point and/or from the end point to the one or more respective intermediate points and from the one or more respective intermediate points to the start point, based at least partially on an estimated regenerative energy production along the route network travelled by the vehicle;

selecting at least one preferred route based at least partially on the estimated energy utilization;

generating a coded energy utilization map; and computing a shortest path between the start point and the end point using a Bellman-Ford algorithm, wherein the Bellman-Ford algorithm evaluates all edges including edges having the one or more negative edge weights.

12. The article of claim 11, wherein the vehicle comprises at least one electric vehicle.

13. The article of claim 11, wherein coding for the coded energy utilization map comprises color coding.

14. A computing device comprising one or more processors coupled to one or more memories, wherein the one or more memories include executable instructions stored thereon, wherein executing the executable instructions result in:

selecting a start point and an end point for a vehicle within a route network;

estimating an energy utilization, for one or more routes of the route network for the vehicle from the start point to one or more respective intermediate points within the route network and from the one or more respective intermediate points to the end point and/or from the end point to the one or more respective intermediate points and from the one or more respective intermediate points to the start point, based at least partially on an estimated regenerative energy production along the one or more routes traveled by the vehicle;

routing of the vehicle using one or more multidirectional network graphs with negative edge weights to estimate the energy utilization based at least partially on an estimated regenerative breaking along one or more segments of the one or more multidirectional network graphs, wherein the routing comprises using an estimated energy loss and/or estimated energy generation as an edge weight, wherein the one or more multidirectional network graphs represent a landscape, and wherein the routing of the vehicle using the one or more multidirectional network graphs with the negative edge weights to estimate the energy utilization based at least partially on a regenerative energy production facilitates generation of a coded map depicting estimated energy utilization by the vehicle across the landscape; and computing a shortest path between the start point and the end point using a Bellman-Ford algorithm, wherein the Bellman-Ford algorithm evaluates all edges including edges having the negative edge weights.

15. The computing device of claim 14, wherein the one or more processors are coupled to an on-board computing system, and wherein the on-board computing system is:

a self-contained computing system; or a cloud-based computing system.

16. The computing device of claim 15, wherein the on-board computing system comprises an input and an output, wherein the input comprises a manual input or a software input, and wherein the output comprises a map display and a data display.

17. The computing device of claim 16, wherein a global positioning system (GPS) module is coupled to the on-board computing system.

18. The computing device of claim 15, wherein the on-board computing system is contained within a portable computer.

19. The computing device of claim 18, wherein the portable computer is a tablet, smartphone, or laptop computer.

* * * * *